(12) United States Patent
Dos Santos et al.

(10) Patent No.: US 11,867,256 B2
(45) Date of Patent: Jan. 9, 2024

(54) ASYMMETRIC BICYCLE CHAIN LINK

(71) Applicant: SRAM DEUTSCHLAND GmbH, Schweinfurt (DE)

(72) Inventors: Pedro Miguel Nunes Dos Santos, Coimbra (PT); Diogo Daniel Soares Da Silva, Coimbra (PT)

(73) Assignee: SRAM DEUTSCHLAND GmbH, Schweinfurt (DE)

( * ) Notice: Subject to any disclaimer, the term of this patent is extended or adjusted under 35 U.S.C. 154(b) by 0 days.

(21) Appl. No.: 17/368,271

(22) Filed: Jul. 6, 2021

(65) Prior Publication Data

US 2022/0056984 A1 Feb. 24, 2022

Related U.S. Application Data

(62) Division of application No. 16/407,986, filed on May 9, 2019, now Pat. No. 11,174,915.

(30) Foreign Application Priority Data

May 11, 2018 (DE) ..................... 10 2018 207 361.9

(51) Int. Cl.
*F16G 13/06* (2006.01)
*B62M 9/00* (2006.01)

(52) U.S. Cl.
CPC .............. *F16G 13/06* (2013.01); *B62M 9/00* (2013.01); *B62M 2009/005* (2013.01)

(58) Field of Classification Search
CPC .... B62M 9/12; B62M 9/10; B62M 2009/005; B62M 9/00; F16G 13/06

USPC ......................................... 474/206, 230, 226
See application file for complete search history.

(56) References Cited

U.S. PATENT DOCUMENTS

| | | | | | |
|---|---|---|---|---|---|
| 4,265,134 | A | * | 5/1981 | Dupoyet | F16G 13/06 59/8 |
| 4,642,078 | A | * | 2/1987 | Dupoyet | F16G 13/06 474/206 |
| 5,098,349 | A | * | 3/1992 | Wu | F16G 13/06 474/206 |
| 5,203,745 | A | * | 4/1993 | Wang | F16G 13/06 474/213 |
| 5,322,482 | A | * | 6/1994 | Wang | F16G 13/06 474/206 |
| 5,346,006 | A | * | 9/1994 | Wu | F16G 13/06 474/212 |

(Continued)

FOREIGN PATENT DOCUMENTS

| CN | 1573164 | 12/2012 |
|---|---|---|
| CN | 102829135 | 12/2012 |

(Continued)

*Primary Examiner* — Henry Y Liu

(57) ABSTRACT

A bicycle chain includes inner link members and outer link member. An inner link having two connecting openings which are formed at a distance from each other, pass through the inner link in the thickness direction thereof and are each designed for receiving a connecting component in order to connect the inner link to a further inner link in order to form an inner link member of a bicycle chain. An outer link member may be formed and attached to the inner link. The inner and/or outer links may be formed with features asymmetric about various orientations of the links.

10 Claims, 11 Drawing Sheets

(56) References Cited

U.S. PATENT DOCUMENTS

| | | | |
|---|---|---|---|
| 5,741,196 A * | 4/1998 | Campagnolo | F16G 13/06 474/209 |
| 7,325,391 B1 * | 2/2008 | Oishi | F16G 13/06 59/5 |
| 8,734,280 B2 * | 5/2014 | Oishi | F16G 13/06 474/230 |
| 9,255,624 B2 * | 2/2016 | Fukumori | F16G 13/06 |
| 9,303,725 B2 * | 4/2016 | Fukumori | B62M 9/00 |
| 9,541,159 B2 * | 1/2017 | Wang | F16G 13/06 |
| 9,939,045 B2 * | 4/2018 | Fukumori | F16G 13/06 |
| 10,352,397 B2 * | 7/2019 | Kamada | B62M 9/10 |
| 10,371,234 B2 * | 8/2019 | Civiero | F16G 13/06 |
| 10,533,633 B2 * | 1/2020 | Dos Santos | F16G 13/06 |
| 2005/0020394 A1 * | 1/2005 | Valle | B62M 9/00 474/155 |
| 2005/0202914 A1 * | 9/2005 | Reiter | F16G 13/06 474/209 |
| 2012/0322599 A1 * | 12/2012 | Oishi | F16G 13/06 474/230 |
| 2015/0094180 A1 * | 4/2015 | Fukumori | F16G 13/06 474/206 |
| 2015/0094181 A1 * | 4/2015 | Fukumori | F16G 13/06 474/206 |
| 2015/0094182 A1 * | 4/2015 | Fukumori | F16G 13/06 474/206 |
| 2015/0292597 A1 * | 10/2015 | Fukumori | F16G 13/06 474/226 |
| 2015/0308542 A1 * | 10/2015 | Fukumori | B62M 9/00 474/230 |
| 2016/0238104 A1 | 8/2016 | Vroman | |
| 2017/0067535 A1 * | 3/2017 | Fukumori | F16G 13/06 |
| 2017/0067536 A1 * | 3/2017 | Dos Santos | F16G 13/06 |
| 2017/0138439 A1 * | 5/2017 | Civiero | B62M 9/10 |
| 2017/0307049 A1 * | 10/2017 | Fukumori | F16G 13/06 |
| 2018/0017131 A1 * | 1/2018 | Fukumori | F16G 13/06 |
| 2018/0031077 A1 * | 2/2018 | Ribeiro | F16G 13/06 |
| 2018/0252294 A1 * | 9/2018 | Kamada | F16G 13/06 |

FOREIGN PATENT DOCUMENTS

| | | |
|---|---|---|
| EP | 2535616 | 12/2012 |
| EP | 3318335 | 5/2018 |

* cited by examiner

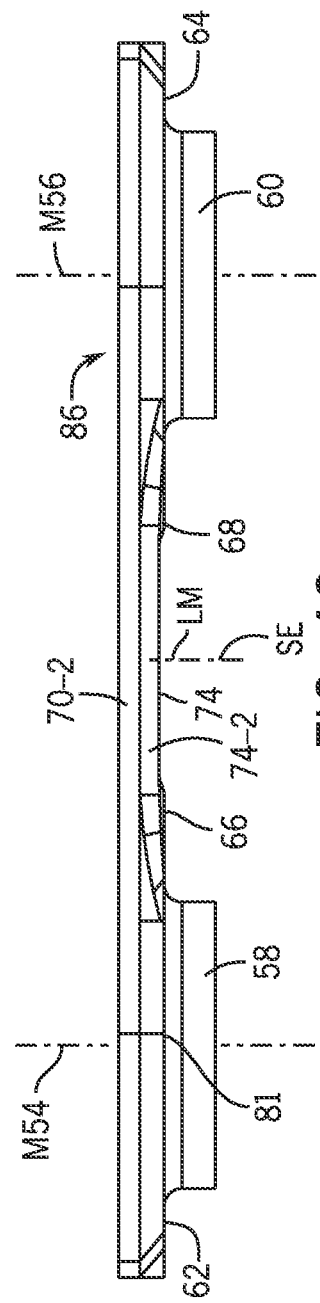

ASYMMETRIC BICYCLE CHAIN LINK

This application is a divisional of and claims priority to, and/or the benefit of, U.S. patent application Ser. No. 16/407,986, filed May 9, 2019, which claims priority to, and/or the benefit of German patent application DE 10 2018 207 361.9, filed May 11, 2018, the contents of which are incorporated herein in their entirety.

FIELD OF INVENTION

The invention relates to a bicycle chain or chain drive system, and specifically to a bicycle chain having links configured in an asymmetric manner.

BACKGROUND

A bicycle chain inner link is known from EP 2 535 616 A or else from U.S. Pat. No. 4,265,134 A. The bicycle chain inner links known from these documents (also only called "inner links" below) are in each case formed mirror-symmetrically both with respect to a plane of symmetry orthogonally intersecting the connecting straight line in the longitudinal center thereof and with respect to a plane of symmetry containing the connecting straight line and running in the thickness direction, which facilitates the mountability of said bicycle chain inner links. This is because it is then sufficient merely to pay attention to the differently configured inner and outer sides of the inner link while, when inner and outer sides of the inner link are correctly oriented, an orientation error of the inner link during mounting of the chain is impossible.

The abovementioned flat surfaces which surround the connecting openings on the inner side of the inner link are designed as contact surfaces for the contact of end sides of chain rollers. One chain roller is accommodated rotatably in each case on each connecting component which connects two opposite inner links to form an inner link member. Such a connecting component can be, for example, a connecting pin or a connecting rivet or a multi-part connecting component.

When a bicycle chain is arranged in an operationally ready state on the bicycle, the axial direction defined by the axis of the rear wheel hub is parallel to the thickness direction of the chain links. These two directional details are therefore equivalent. To avoid misunderstandings, for the description of the constructive relationships of the bicycle chain and rear wheel pinion arrangement, use is made of the orthogonal system of coordinates of the inner link, that is introduced at the beginning, consisting of longitudinal direction, thickness direction and width direction.

With the decades-old trend in bicycle engineering for increasing the number of pinions on the rear wheel hub, in order to obtain as fine a gradation as possible of the transmission of torque from the pedal cranks to the rear wheel hub, the pinion distances between adjacent pinions have become smaller, the pinions have become thinner and the chains narrower. The abovementioned depression region is, for example, a result of the bicycle chains becoming ever narrower in the thickness direction of the inner links. This is because, at least in that region of an inner link intermediate space, into which a pinion tooth enters in order to produce a meshing engagement with an inner link member of the bicycle chain, the link distance, which is to be measured in the thickness direction, between the inner sides of the inner links is locally increased by means of the depression region in comparison to the link distance in the region between the flat surfaces of mutually opposite inner links. This facilitates the entry of the pinion into the inner link intermediate space. The inner link intermediate space is bounded here in the longitudinal direction of the inner link member by the two chain rollers, which follow each other in the longitudinal direction, of the inner link member and is bounded in the thickness direction by the two inner links of the inner link member, between which inner links the chain rollers are arranged.

U.S. Pat. No. 4,265,134 A thus expressly discloses forming the depression region from each side edge of the inner link towards the connecting straight line with a decreasing longitudinal dimension, i.e. with a dimension parallel to the connecting straight line, in order thereby to obtain a recess on the inner sides of the inner links, the recess tapering into the inner link intermediate space. This is intended to particularly facilitate entry of a pinion tooth into the inner link intermediate space.

With an increasing number of pinions and therefore with a decreasing link distance between the links of the individual bicycle chain members, ever more precise guiding of the chain in the driving mode is required since the engagement locations between the bicycle chain and the individual pinions of a rear wheel pinion cassette, which pinions are assigned individual transmission ratios, lie increasingly closer to one another along the rear wheel axle.

SUMMARY

In an embodiment, a bicycle chain inner link is provided. The bicycle chain inner link includes two connecting openings which are formed at a distance from each other, pass through the inner link in the thickness direction thereof and are each designed for receiving a connecting component in order to connect the inner link to a further inner link in order to form an inner link member of a bicycle chain. A connecting straight line connecting respective center axes of the connecting openings defines a longitudinal direction of the inner link, and wherein a direction orthogonal both with respect to the longitudinal direction and also with respect to the thickness direction is a width direction of the inner link. The inner link has, on its inner side facing the further inner link of the same inner link member in the completely mounted state in a bicycle chain, two flat surfaces which are provided at a distance from each other in the longitudinal direction of the inner link; and are separated by a depression region, which is placed in the longitudinal direction between them, and of which each flat surface surrounds another of the connecting openings. The depression region is set back with respect to the flat surfaces towards an outer side of the inner link that is opposite the inner side. A distance, to be measured along the longitudinal direction, between the flat surfaces changes along the width direction in such a manner that a location situated between two distance regions having in each case greater distance values and having the smallest, but finitely large minimum distance value is situated at a distance away from the connecting straight line in the width direction.

In an embodiment, a bicycle chain outer link is provided. The bicycle chain outer link includes two connecting openings which are formed at a distance from each other, pass through the outer link in the thickness direction thereof and are each designed for receiving a connecting component in order to connect the outer link to a further outer link in order to form an outer link member of a bicycle chain. A connecting straight line connecting respective center axes of the connecting openings defines a longitudinal direction of the outer link. A direction orthogonal both with respect to the longitudinal direction and with respect to the thickness direction is a width direction of the outer link. The outer link has, on its inner side facing the further outer link of the same outer link member in the completely mounted state in a bicycle chain, two flat surfaces which are provided at a distance from one another in the longitudinal direction if the outer link and are separated by a depression region, which is placed in the longitudinal direction between them, and of which each flat surface surrounds another of the connecting openings. The depression region is set back with respect to the flat surfaces towards an outer side of the outer link that is opposite the inner side. In a minimum distance region containing the connecting straight line and extending in the width direction, the distance, to be measured in the longitudinal direction, between the flat surfaces is minimal. The distance between the flat surfaces starting from the minimum distance region becomes larger towards each of the two side edges bounding the outer link in the width direction.

BRIEF DESCRIPTION OF THE DRAWINGS

The present invention will be explained in more detail below with reference to the attached drawings, in which:

FIG. 4C illustrates a schematic top view of the inner link from FIG. 4A, in a view along the arrow IV-C in FIG. 4A.

DETAILED DESCRIPTION OF THE DRAWINGS

Figure 1:
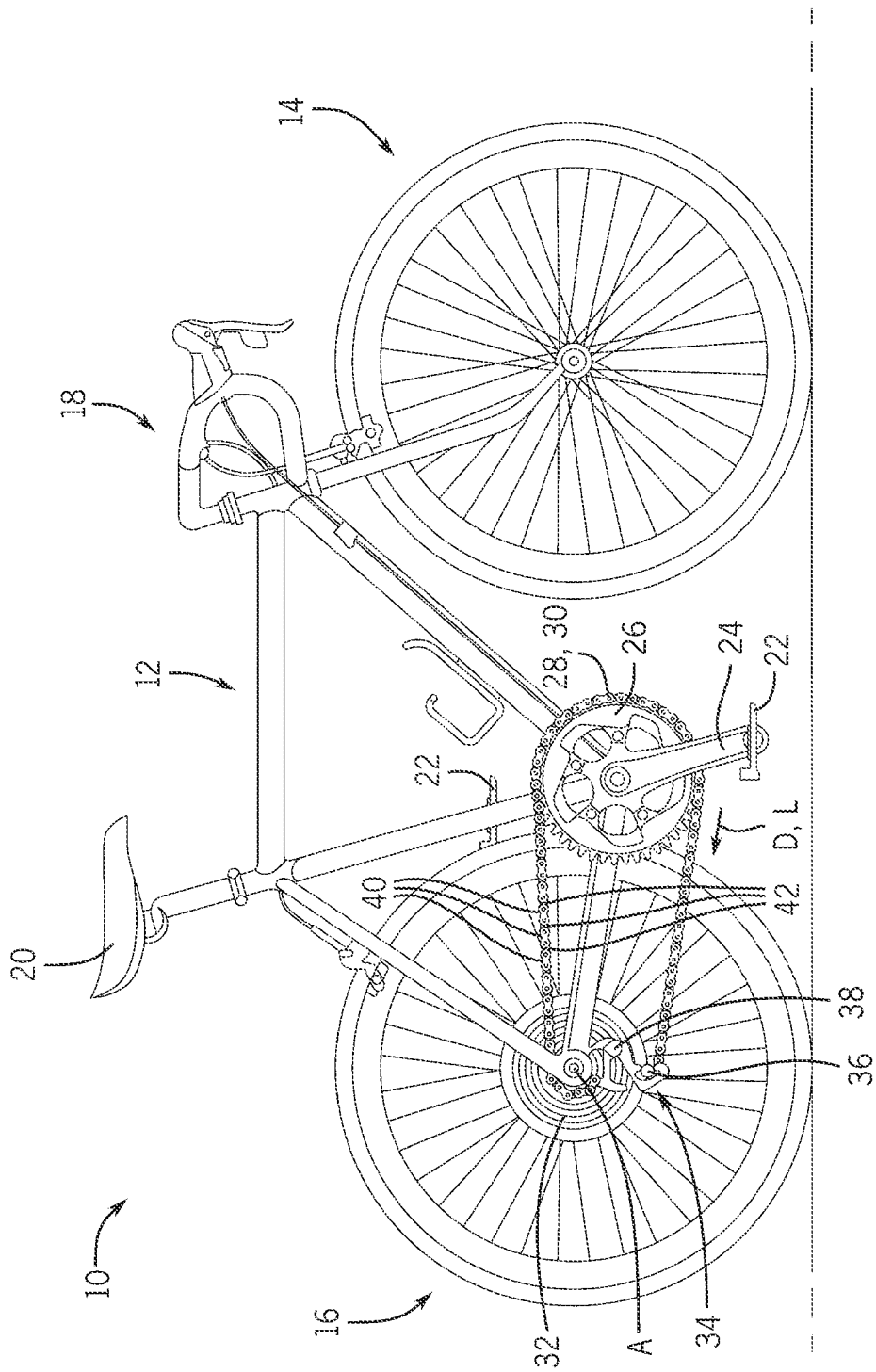
FIG. 1 illustrates a schematic side view of a bicycle with a chain ring of the present application, which chain ring uses inner links or/and outer links of the present application, in a view in a direction parallel to the rear wheel axle.

It is therefore the object of the present invention to provide a technical teaching which permits as precise a guidance of a bicycle chain as possible even if the bicycle chain having outer and inner link members in an alternating manner has a very narrow design for engagement with a rear wheel pinion arrangement, for example having 10 or more pinions.

This object is achieved according to the invention by a bicycle chain inner link of the type mentioned at the beginning which is designed as an asymmetric bicycle chain inner link, and therefore a distance, to be measured along the longitudinal direction, between the flat surfaces changes along the width direction in such a manner that a location situated between two distance regions having in each case greater distance values and having the smallest, but finitely large minimum distance value is situated at a distance away from the connecting straight line in the width direction.

In the prior art, for the driving mode as intended, the bicycle chain has frequently been structurally configured solely in respect of its meshing engagement with the pinions of the rear wheel pinion arrangement. The fact that the bicycle chain, which can be shifted by a rear derailleur between the individual pinions of the rear wheel pinion arrangement, is not only in engagement with the pinions of the rear wheel pinion arrangement, but also with the rollers of the derailleur, has frequently been disregarded. Particularly the chain guiding roller which positions the bicycle chain along the rear wheel axle has an important role here.

During the revolving on the bicycle, an inner link of a bicycle chain, which is designed to form a chain ring and revolves in a self-contained manner, starting from a front sprocket generally reaches, in the sequence mentioned, first of all the tensioning roller and then the chain guiding roller of the derailleur, subsequently the meshing pinion, which is selected by positioning of the derailleur, and finally the sprocket again. In the process, the chain guiding roller and the meshing pinion engage on the chain ring on different sides thereof. Consequently, in the driving mode, the teeth of the chain guiding roller, which teeth are customarily formed with a considerably lower tooth height than the teeth of the pinions, and the teeth of the meshing pinion enter into the inner link intermediate space from opposite sides.

The chain does indeed always run over the same chain guiding roller and does not have to be shifted from the latter to another, as is the case during a shifting operation on the rear wheel pinion arrangement. Nevertheless, bicycle chain dimensions becoming increasingly more extreme can also lead to problems with the engagement between the chain guiding roller and the bicycle chain, which can comprehensibly adversely affect the shifting precision on the rear wheel hub.

With the inner link presented above, it is extremely advantageously possible to optimally design the inner side of the inner link, which inner side faces the respective tooth during a meshing engagement, both for the meshing engagement with the pinion generally having higher pinion teeth and for the meshing engagement with the chain guiding roller generally having lower roller teeth. Both the pinion tooth and the roller tooth taper from their tooth root towards their tooth tip. The tooth height of the pinion tooth here is generally of such a magnitude that the pinion tooth projecting into the inner link intermediate space projects, starting from the one side edge, which is the entry side therefor, of the inner link in the width direction of the inner link or of the inner link member beyond the connecting straight line. In contrast thereto, the tooth height of a roller tooth of the chain guiding roller is generally of such a low magnitude that the roller tooth projecting into the inner link intermediate space, starting from the other, opposite side edge, which is the entry side for the roller tooth, does not reach in the width direction as far as the connecting straight line. Since, on the presented inner link, the minimum distance value of the longitudinal distance between the flat surfaces is placed at a distance away from the connecting straight line in the width direction, and since furthermore there is a greater distance between the flat surfaces in the width direction on both sides of the location of the minimum distance value, the presented inner link takes into account both the structural differences of pinion tooth and roller tooth and the engagement situations arising with said teeth. The same applies to an inner link member which is formed by two identical inner links lying mirror-symmetrically opposite each other.

Chain links are customarily constricted in the width direction in the region of the longitudinal center of the connecting straight line, i.e. a chain link has a smaller width dimension in the region of the longitudinal center of the connecting straight line than in the region of the connecting openings. In an advantageous manner, in addition to the engagement of a tooth in the inner link intermediate space, a side edge of the inner link can stabilise the inner link at the respective tooth-carrying component by the fact that the distances of those side edge portions of the inner link that run in the longitudinal direction between the connecting openings away from the connecting straight line in the width direction differ in size on different sides of the connecting straight line.

Since, firstly, the pinion teeth project in the width direction more deeply into the inner link intermediate space than the roller teeth, and since, furthermore, the bicycle chain is always in engagement with the same chain guiding roller, but with pinions of different diameter, the side edge of the inner link having the greater distance away from the longitudinal center of the connecting straight line is preferably the side edge on the inlet side for a roller tooth. This means that the location of the minimum distance value with respect to the connecting straight line is preferably situated on that side of the inner link on which the distance of the side edge portion away from the connecting straight line is greater. Therefore, even for a roller tooth with a short tooth height, wall portions overlapping with the roller tooth in the width direction can be provided on the inner side of the inner link, said wall portions reliably guiding the inner link and the bicycle chain formed by it on the guide roller in the thickness direction. Since, in contrast to the pinions with which the chain enters into engagement, the radius of curvature of the chain guiding roller does not change, the side edge on the inlet side for the roller tooth can be configured in such a manner that, during engagement of a roller tooth, said side edge lies against an outer surface of the one roller body of the chain guiding roller and thus additionally stabilises the bicycle chain, which is formed with the participation of the presented inner link, on the chain guiding roller.

As stable a lateral guidance as possible in the thickness direction of an inner link member, which is formed by the presented inner link, on a roller tooth with a short tooth height can be achieved in that the side edge portion with the greater distance away from the connecting straight line runs rectilinearly parallel to the latter. The rectilinear side edge portion can then lie in a stabilising manner as a tangent against a, for example, doubly conical, roller body of the chain guiding roller.

In contrast to the chain guiding roller, a pinion body situated radially within the teeth of a pinion does not contribute to the guiding of the chain on the pinion. In order to save weight, on the one hand, and for easier production of a meshing engagement with a pinion during a shifting operation, on the other hand, preferably the opposite side edge portion having the smaller distance away from the longitudinal center of the connecting straight line is therefore designed in such a manner that it first of all along its profile in the longitudinal direction approaches the connecting straight line and then moves away from the latter again. This constriction makes it possible to reduce the amount by which the connecting straight line of the inner link has to be raised over a pinion tooth tip in order, particularly during the shifting operation onto a pinion of larger diameter, to shift the pinion tooth tip, which is initially situated outside an inner link member in the thickness direction, into the region between the two inner links.

An advantageous engagement situation both with pinion teeth and with roller teeth of the chain guiding roller can be achieved by the fact that the location of the minimum distance value is situated closer in the width direction to a side edge portion of the inner link, which side edge portion runs between the connecting openings in the longitudinal direction, than the connecting straight line. In case of doubt, the distance between the location of the minimum distance value and a side edge portion should be determined in the longitudinal direction wherever the side edge portion has approached the connecting straight line to the greatest extent in the width direction.

In order to be able to use the depression region of an inner link as an insertion aid of a tooth into the inner link intermediate space or/and as an approximately negative form-fitting contour of a tooth already introduced into the inner link intermediate space, in an advantageous development of the present invention, in the width direction on both sides of the connecting straight line, in each case at a distance from the location of the minimum distance value, there can be in each case a location of a maximum distance value at which the distance, which occurs on the respective side of the connecting straight line on the inner side of the inner link and is to be measured in the longitudinal direction, between the two flat surfaces is greatest. For clarity, it should be emphasised that each of the two maximum distance values is greater in terms of amount than the minimum distance value. On account of the asymmetry, which exists in the width direction of the inner links, of the presented inner link, the distance of the location of the minimum distance value away from the respective locations of the maximum distance values preferably differs in size.

The depression region preferably completely passes through the inner link in the width direction.

The location of the minimum distance value can be merely a virtually point-shaped location in the width direction without a significant dimension in the width direction, or it can be a minimum distance value range extending over a predetermined distance in the width direction.

In principle, an edge of a flat surface in the region between the connecting openings can have a curved profile, and also the radially outer edges of the chain rollers lying with their end sides against the flat surfaces can have a curved, namely circular profile. During the engagement of a pinion tooth or else of a roller tooth in an inner link intermediate space, it can be overall advantageous for the stability of the inner link member formed by the presented inner links and therefore of a bicycle chain having such inner link members if at least one flat surface protrudes radially over the cylindrical outer surface of a chain roller with respect to a center axis, running in the thickness direction, through the connecting openings. This makes it possible to prevent that, during the production of a meshing engagement between tooth and inner link member, a portion of the tooth tip penetrates between chain roller and inner link and thus possibly expands or even breaks the inner link member in the thickness direction. Said advantageous local radial protrusion of the flat surface over the chain roller can be provided by the fact that, in a longitudinal region of the inner link situated between the connecting openings, the edge of at least one flat surface runs in the width direction rectilinearly at least in portions or with a greatest radius of curvature along the surface edge encircling the connecting opening. For the reasons mentioned, the edges of the two flat surfaces preferably run rectilinearly at least in portions on both sides of the depression region in the longitudinal region of the inner link.

Whenever, in said longitudinal region, the edges of the two flat surfaces run rectilinearly at least in portions, the rectilinear edge portions of the edges of the flat surfaces can run parallel to one another at least in portions. The width portion in which the rectilinear edge portions of the edges of the flat surfaces run, then preferably forms the abovementioned minimum distance value region. This is of advantage, for example, if the pinion arrangement interacting with the inner link has numerous pinion teeth of differing tooth height. The depression region can then continue to serve as an insertion aid for said different pinion teeth into the inner link intermediate space and, for a multiplicity of different pinion teeth, is formed after production of the meshing engagement, for the defined arrangement of said pinion teeth in the inner link intermediate space.

Whenever, in said longitudinal region, the edges of the two flat surfaces run rectilinearly at least in portions, a very precise guidance of the inner link members and therefore of the chain by the inner link by way of pinion teeth tapering towards the tooth tip can be provided by the fact that the distance, which is to be recovered in the longitudinal direction, of the rectilinear portions is reduced at least in portions from edges of the flat surfaces in the width direction as they approach closer to the location of the minimum distance value. Although this reduction can also take place in a stepwise manner, a continuous stepless reduction of said distance is preferred in respect of the contour of the pinion tooth, but also roller tooth, which enters into the inner link intermediate space and is temporarily accommodated there.

For the engagement with the pinion teeth and also with the roller teeth on both sides of the location of the minimum distance value, rectilinearly running portions of the edges of the flat surfaces can be formed, the distance of which portions is reduced in the longitudinal direction as they approach the location of the minimum distance value.

In order, firstly, to be able to adapt the profile of a flat surface to the configuration of the chain roller lying thereagainst and in order, secondly, to be able to provide an edge of the flat surface, which edge is as kink-free or/and as jump-free as possible and therefore promotes entry of a tooth into the inner link intermediate space, in a longitudinal region of the inner link, which longitudinal region is situated between the connecting openings, the edge of at least one flat surface can run in the width direction in a manner curved continuously in the same direction. The profile of the edge of the flat surface can then be particularly readily adapted to the contour, which tapers towards the tooth tip, in particular of a pinion tooth if the curved profile of the edge of the flat surface is assigned changing radii of curvature along the width direction. The radii of curvature preferably become smaller with increasing distance from the location of the minimum distance value, i.e. the curvature of the respective edge portion becomes greater. Then, in addition, the abovementioned radial protrusion of the flat surface over the cylindrical circumferential surface of a chain roller assigned to the flat surface for contact therewith can also be realized with a curved edge profile. This preferably holds true for both flat surfaces of the inner link.

In principle, it should not be ruled out that the depression region is of convexly curved design in a width region containing the connecting straight line, when looking at the inner link inner side, for example is curved about an axis of curvature parallel to the connecting straight line. However, a greater inner link intermediate space available for receiving a tooth can be obtained with a depression region which, in a width region containing the connecting straight line, has a flat surface region. In principle, said flat surface region can be inclined. To facilitate the introduction of a tooth into the inner link intermediate space, the inclination, if it is present, is preferably such that the link distance, to be measured in the thickness direction, of the flat surface regions of two inner links lying mirror-symmetrically opposite each other of one and the same inner link member becomes greater towards a side edge away from the minimum distance value in the width direction. However, a flat surface region which is orthogonal with respect to the thickness direction is preferred for providing as large a receiving volume as possible of the inner link intermediate space.

The flat surface region, following the presented asymmetry of the inner link, is preferably arranged offset towards a side edge region relative to the connecting straight line in the width direction. The flat surface region is preferably arranged offset towards that side edge region which is situated closer to the location of the minimum distance value, and therefore an insertion slope having a greater dimension in the width direction can be provided on the side edge portion on the inlet side for the pinion tooth than on the side edge portion on the inlet side for the roller tooth, for example in the form of a chamfering. This facilitates the introduction of a pinion tooth into the inner link intermediate space.

For simple but reliable definition of the distance between two inner links forming an inner link member and also furthermore as a defined axle formation which can rotatably receive a chain roller, according to an advantageous development the connecting openings are radially surrounded within the flat surfaces surrounding them in each case by sleeve portions. The sleeve portions protrude in the thickness direction of the inner links over the flat surfaces surrounding said sleeve portions.

In order to obtain a bicycle chain which is as slender as possible in the thickness direction of the links forming the latter, the outer side of the inner link that is opposite the inner side preferably has a flat outer surface which both extends in the longitudinal direction between the connecting openings, where, during a shifting operation, a side surface of a pinion tooth of a pinion coming into engagement by means of the shifting operation can enter into contact engagement, and also at least partially surrounds the connecting openings where inner side regions of an outer link can come into contact with the completely mounted bicycle chain. The flat outer surface preferably completely surrounds the connecting openings.

It is indeed in principle not ruled out that the outer side of the inner link also has, in addition to the flat outer surface, a further, non-flat outer surface. However, in order to obtain the abovementioned slender bicycle chain, it is preferred that the outer side is free from projections which protrude over the flat outer surface in the thickness direction.

By contrast, it should not only not be ruled out, but it is even preferred that the outer side of the inner link has hollows or depression surrounding the connecting openings and in which corresponding projections on inner sides of outer links can engage in order to position the inner link and an outer link adjoining the latter relative to each other. In order also to obtain a centring effect, the depressions are preferably formed tapering in a direction away from the flat outer surface. For example, the depressions can have a negatively frustoconical configuration.

For the proposed inner link, it then advantageously does not matter for the running direction of the bicycle chain formed with the participation of said inner link if the inner side or/and the outer side, preferably the entire inner link, is mirror-symmetrical with respect to a plane of symmetry orthogonal with respect to the connecting straight line.

The abovementioned object is also achieved by a bicycle chain outer link having two connecting openings which are formed at a distance from each other, pass through the outer link in the thickness direction thereof and are each designed for receiving a connecting component in order to connect the outer link to a further outer link in order to form an outer link member of a bicycle chain, wherein a connecting straight line connecting respective center axes of the connecting openings defines a longitudinal direction of the outer link, and wherein a direction orthogonal both with respect to the longitudinal direction and with respect to the thickness direction is a width direction of the outer link, wherein the outer link has, on its inner side facing the further outer link of the same outer link member in the completely mounted state in a bicycle chain, two flat surfaces which are provided at a distance from one another in the longitudinal direction of the outer link and are separated by a depression region, which is placed in the longitudinal direction between them, of which each flat surface surrounds another of the connecting openings, wherein the depression region is set back with respect to the flat surfaces towards an outer side of the outer link that is opposite the inner side, wherein, in a minimum distance region containing the connecting straight line and extending in the width direction, the distance, to be measured in the longitudinal direction, between the flat surfaces is minimal, wherein the distance between the flat surfaces starting from the minimum distance region becomes larger towards each of the two side edges bounding the outer link in the width direction.

Such an outer link can facilitate the introduction of a pinion tooth into the outer link intermediate space. The depression regions of outer links which are opposite one another in the thickness direction and are connected by connecting components to form an outer link member of a bicycle chain form a region on the outer link member, in which region the outer link member has a greater link distance, to be measured in the thickness direction, than, for example, in the region of the flat surfaces which are designed for contact against outer sides of inner links. By means of the expansion of the depression regions in the approach towards the side edges bounding the outer link in the width direction, the depression regions can act as introduction funnels for pinion teeth, and starting from virtually any arrangement of a pinion tooth tip in the entry region of an outer link intermediate space, can guide pinion teeth into said intermediate space.

What has been stated at the beginning with regard to the connecting components of inner link members holds true for the connecting components of outer link members.

The distance between the flat surfaces does not have to become smaller continuously from the side edge as far as the minimum distance region. It is entirely sufficient if a change in the distance between the flat surfaces substantially takes place in a region situated close to the respective side edge. As a result, an advantageously stiff outer link can be obtained. Depending on how the edge of the respective flat surfaces runs in the region in which the flat surfaces are adjacent to the depression region in the longitudinal direction, an outer link which both promotes the entry of a pinion tooth into the outer link intermediate space and is also advantageously stiff can be obtained in that, for at least one width region of the outer link, it holds true that a distance, to be measured in the longitudinal direction, between potions of edges, which are adjacent to the depression region, of the flat surfaces changes more greatly in the 50%, preferably 30%, particularly preferably 10% of the width dimension of the width region that is situated closest to the longitudinal center of the side edge than in the 30%, preferably 40%, particularly preferably 50% of the width dimension of the width region that is situated closest to the connecting straight line.

Said width region of the outer link extends from the connecting straight line parallel to the width direction as far as the longitudinal center of a side edge. Consequently, the outer link has two width regions, one on each side of the connecting straight line. What has been stated above preferably holds true for both width regions of an outer link.

For a bicycle chain, it is important that inner and outer link members which are connected to one another in an articulated manner via a connecting component can be safely bent about the axis of the connecting component. The neat revolution of the chain around sprockets, pinions and rollers of different diameters can thereby be ensured. This ensures that the bicycle chain remains in engagement with the respective tooth-carrying components of the bicycle and is not inclined, for example, to jump from a sprocket or a pinion. One reason for an undesirable stiffening of a bicycle chain within the context of increased bending resistance is a penetration of particles into the region between surface portions of inner and outer link lying against one another.

A configuration of the outer link which promotes both entry of a pinion tooth into the outer link intermediate space and also counteracts entry of particles between said surface portions of inner and outer link can advantageously be achieved by the fact that the distance between the flat surfaces on the inner side of the outer link increases more greatly in the direction of the one side edge on a first side of a reference plane orthogonally intersecting the connecting straight line in its longitudinal center than on the opposite, second side of the reference plane. As a result, the edge of a flat surface can run congruently with the outer edge of an end portion of an inner link, said end portion lying against said flat surface, and the edge of the second flat surface, which is situated away in the longitudinal direction, can protrude with respect to a center axis, running in the thickness direction, of the connecting opening, which is surrounded by said flat surface, radially over the outer edge of an end portion of another inner link, said end portion lying against said other flat surface. This radial protrusion prevents particles which are entrained, for example, by way of a soiled pinion tooth tip from approaching the gap existing between outer link and inner link.

Said radial protrusion does not exist, or exists in a smaller extent, on the first-mentioned flat surface on the inner side of the outer link and that end portion of the inner link which lies thereagainst. Nevertheless, even in the case of congruent edges of the flat surface of the outer link inner side and end portion of the inner link outer side, which edges are preferably chamfering-free in order to avoid dirt entering the gap between the inner and outer link, a narrow gap size between the flat surface and end portion of the inner link can still be maintained. This counteracts the entry of particles or even of a portion of a tooth tip into the gap. In the event of a congruent design, in said region both the edge of the flat surface of the outer link inner side and the outer edge of the adjacent end portion of the inner link outer side are preferably formed in a circular manner with the center axis of the connecting component as center axis of the circular configuration. The congruence of the edge portions is then maintained over a predetermined relative movement portion of inner and outer link irrespective of a relative rotation of outer link and inner link.

The distance preferably also increases to a differing extent in the opposite direction towards the respective other side edge on the different sides of the reference plane, specifically particularly preferably to a greater extent on the second side of the reference plane than on the first side thereof.

Tapering of the depression region from a side edge portion in the width direction towards the connecting straight line can be obtained under the abovementioned boundary conditions of an outer link which is not mirror-symmetrical and has advantageously jump- and kink-free edges of a flat surface in a region adjacent to the depression region in that, for the flat surface, it holds true that a region of the edge of the flat surface that is adjacent to the depression region is curved to a differing degree in the width direction on different sides of the connecting straight line. This preferably holds true for the two flat surfaces of the inner side of the outer link, which flat surfaces each surround a different connecting opening.

A radial protrusion of a flat surface on one side of the connecting straight line and a smaller radial protrusion or a profile of the edge of the flat surface, which profile is congruent with the outer edge of the adjacent inner link, on the other side of the connecting straight line can be obtained in that, for the flat surface, it holds true that that region of the edge of the flat surface that is adjacent to the depression region has a curved profile in portions in the width direction on one side of the connecting straight line and a rectilinear profile in portions on the other side. This preferably holds true for the two flat surfaces. This will be explained using the example of a chain joint which is formed by an outer link member and an inner link member which is connected to the latter and trails in the driving direction of rotation of the chain ring formed by the bicycle chain. On account of the trailing in the driving direction of rotation, the chain roller of the chain joint and optionally outer edge regions of the inner links holding the chain roller between them in the width direction are permanently in torque-transmitting contact engagement with a pinion tooth during a meshing engagement with a pinion. It can be advantageous there to form the flat surfaces of the outer link inner sides, which flat surfaces surround the connecting openings involved in the formation of said chain joint, on that side of the chain joint which faces the pinion axis, i.e. which are situated radially on the inside on the chain ring, with a high radial protrusion with respect to the outer edges of those end regions of inner link outer sides which lie thereon. By contrast, on that side of the chain joint which is situated radially on the outside of the chain ring, and also on that side of the chain joint, which leads in the driving direction of rotation, of the same outer link member that is situated radially on the inside, the mechanically less greatly loaded edges, which are therefore also less greatly exposed to a risk of soiling, of the flat surfaces can be formed with a smaller radial protrusion or congruently with the outer edge of the adjacent inner link end regions. Consequently, on the leading chain roller with respect to the observed outer link intermediate space, an enlarged entry region into the intermediate space is provided for a pinion tooth on the radially inner side of the chain ring.

The outer link can therefore be designed in accordance with the above explanations in such a manner that a curved edge region portion of the respective other flat surface lies opposite that edge region portion which is rectilinear in portions in the longitudinal direction. Conversely, the same preferably holds true for the curved region of the edge of the same flat surface, i.e. that a rectilinear portion of an edge of the other flat surface lies opposite said curved region in the longitudinal direction.

In principle, for easier introduction of a pinion tooth into the outer link intermediate space, it is advantageous if, in a first width region of the outer link, which width region extends from the connecting straight line parallel to the width direction as far as the longitudinal center of the one side edge, the distance between edge portions of the flat surfaces that are adjacent to the depression region is at a maximum in the region of the longitudinal center of the one side edge. For easier production of an engagement even of a roller tooth with the outer link intermediate space, with the roller tooth, by comparison with a pinion tooth, entering the outer link intermediate space from the opposite direction in the width direction, it can therefore be advantageous if in a second width region of the outer link, which width region extends from the connecting straight line parallel to the width direction in the opposite direction as far as the longitudinal center of the other side edge, the distance between edge portions of the flat surfaces that are adjacent to the depression region is at maximum in the region of the longitudinal of the other side edge. To facilitate the mounting of such an outer link during the production of a bicycle chain, the maximum distances in the first and in the second width region are preferably identical in size in terms of amount.

To facilitate an accurately fitting arrangement of outer link and inner link during the production of a bicycle chain, each of the connecting openings of the outer link on the inner side is preferably surrounded radially within the flat surface surrounding them by a projection protruding in the thickness direction over the respective flat surface. On the finished bicycle chain, said projection preferably projects into the abovementioned depression on the outer side of an inner link and thus defines the relative position of outer link and inner link with respect to their connecting openings, which are each aligned in order to form a chain joint. The projection is preferably designed tapering in a direction away from the respective flat surface, and therefore, in particular in interaction with a depression tapering in the thickness direction into the inner link, said projection can deploy a centring effect. The projection is preferably frustoconical.

Whenever the outer link has a depression region which is not mirror-symmetrical, to facilitate the mounting of said outer link, it is nevertheless preferably provided that the inner side or/and the outer side, preferably the entire outer link, is point-symmetrical with respect to an axis of symmetry intersecting the connecting straight line in the longitudinal center thereof and running in the thickness direction. Symmetry present on the outer link eliminates the possibility of an erroneous arrangement of the outer link on the bicycle chain.

For the facilitated mounting of the outer link with a considerably reduced risk of error, it is therefore particularly preferred that the inner side or/and the outer side, preferably the entire outer link, is mirror-symmetrical both with respect to a first plane of symmetry orthogonally intersecting the connecting straight line in the longitudinal center thereof and with respect to a second plane of symmetry running in the thickness direction and containing the connecting straight line.

In addition, the present invention relates to a chain ring, comprising a bicycle chain revolving in a self-contained manner and having outer and inner link members following one another in an alternating manner in the revolving direction, wherein the inner link members are formed from two asymmetric inner links, as described above, or/and wherein the outer link members are formed from two outer links designed as described above. Such a chain ring also embodies the technical advantages associated with the present invention and achieves the object mentioned at the beginning on account of the use of the links presented above.

As has already been described in detail above, the above-described asymmetric inner link serves especially for forming preferred inner link members which, with their one side edge, permit an extremely advantageous meshing engagement with a pinion of a rear wheel pinion cassette and which, with their side edge respectively opposite in the width direction, permit a particularly advantageous engagement with a chain guiding roller of a derailleur. Inner link members consisting of inner links, the two side edge portions of which are at a distance of differing size from the connecting straight line in the width direction, are arranged on the chain ring, in order to obtain the advantageous engagement situations mentioned both with pinions and with the chain guiding roller, in such a manner that the side edge portions at the greater distance from the connecting straight line are arranged lying radially on the outside of the chain ring. This is because, during a revolution of the chain ring on a bicycle, the radially outer side of the chain ring is situated closer to a body of the chain guiding roller, while, during said revolution, the radially inner side of the chain ring is situated closer to a body of the meshing pinion of the rear wheel pinion arrangement.

This object is achieved according to the an embodiment by a bicycle chain inner link of the type mentioned at the beginning which is designed as an asymmetric bicycle chain inner link, and therefore a distance, to be measured along the longitudinal direction, between the flat surfaces changes along the width direction in such a manner that a location situated between two distance regions having in each case greater distance values and having the smallest, but finitely large minimum distance value is situated at a distance away from the connecting straight line in the width direction.

In the prior art, for the driving mode as intended, the bicycle chain has frequently been structurally configured solely in respect of its meshing engagement with the pinions of the rear wheel pinion arrangement. The fact that the bicycle chain, which can be shifted by a rear derailleur between the individual pinions of the rear wheel pinion arrangement, is not only in engagement with the pinions of the rear wheel pinion arrangement, but also with the rollers of the derailleur, has frequently been disregarded. Particularly the chain guiding roller which positions the bicycle chain along the rear wheel axle has an important role here.

During the revolving on the bicycle, an inner link of a bicycle chain, which is designed to form a chain ring and revolves in a self-contained manner, starting from a front sprocket generally reaches, in the sequence mentioned, first of all the tensioning roller and then the chain guiding roller of the derailleur, subsequently the meshing pinion, which is selected by positioning of the derailleur, and finally the sprocket again. In the process, the chain guiding roller and the meshing pinion engage on the chain ring on different sides thereof. Consequently, in the driving mode, the teeth of the chain guiding roller, which teeth are customarily formed with a considerably lower tooth height than the teeth of the pinions, and the teeth of the meshing pinion enter into the inner link intermediate space from opposite sides.

The chain does indeed always run over the same chain guiding roller and does not have to be shifted from the latter to another, as is the case during a shifting operation on the rear wheel pinion arrangement. Nevertheless, bicycle chain dimensions becoming increasingly more extreme can also lead to problems with the engagement between the chain guiding roller and the bicycle chain, which can comprehensibly adversely affect the shifting precision on the rear wheel hub.

With the inner link presented above, it is extremely advantageously possible to optimally design the inner side of the inner link, which inner side faces the respective tooth during a meshing engagement, both for the meshing engagement with the pinion generally having higher pinion teeth and for the meshing engagement with the chain guiding roller generally having lower roller teeth. Both the pinion tooth and the roller tooth taper from their tooth root towards their tooth tip. The tooth height of the pinion tooth here is generally of such a magnitude that the pinion tooth projecting into the inner link intermediate space projects, starting from the one side edge, which is the entry side therefor, of the inner link in the width direction of the inner link or of the inner link member beyond the connecting straight line. In contrast thereto, the tooth height of a roller tooth of the chain guiding roller is generally of such a low magnitude that the roller tooth projecting into the inner link intermediate space, starting from the other, opposite side edge, which is the entry side for the roller tooth, does not reach in the width direction as far as the connecting straight line. Since, on the presented inner link, the minimum distance value of the longitudinal distance between the flat surfaces is placed at a distance away from the connecting straight line in the width direction, and since furthermore there is a greater distance between the flat surfaces in the width direction on both sides of the location of the minimum distance value, the presented inner link takes into account both the structural differences of pinion tooth and roller tooth and the engagement situations arising with said teeth. The same applies to an inner link member which is formed by two identical inner links lying mirror symmetrically opposite each other.

Chain links are customarily constricted in the width direction in the region of the longitudinal center of the connecting straight line, i.e. a chain link has a smaller width dimension in the region of the longitudinal center of the connecting straight line than in the region of the connecting openings. In an advantageous manner, in addition to the engagement of a tooth in the inner link intermediate space, a side edge of the inner link can stabilize the inner link at the respective tooth carrying component by the fact that the distances of those side edge portions of the inner link that run in the longitudinal direction between the connecting openings away from the connecting straight line in the width direction differ in size on different sides of the connecting straight line.

Since, firstly, the pinion teeth project in the width direction more deeply into the inner link intermediate space than the roller teeth, and since, furthermore, the bicycle chain is always in engagement with the same chain guiding roller, but with pinions of different diameter, the side edge of the inner link having the greater distance away from the longitudinal center of the connecting straight line is preferably the side edge on the inlet side for a roller tooth. This means that the location of the minimum distance value with respect to the connecting straight line is preferably situated on that side of the inner link on which the distance of the side edge portion away from the connecting straight line is greater. Therefore, even for a roller tooth with a short tooth height, wall portions overlapping with the roller tooth in the width direction can be provided on the inner side of the inner link, said wall portions reliably guiding the inner link and the bicycle chain formed by it on the guide roller in the thickness direction. Since, in contrast to the pinions with which the chain enters into engagement, the radius of curvature of the chain guiding roller does not change, the side edge on the inlet side for the roller tooth can be configured in such a manner that, during engagement of a roller tooth, said side edge lies against an outer surface of the one roller body of the chain guiding roller and thus additionally stabilizes the bicycle chain, which is formed with the participation of the presented inner link, on the chain guiding roller.

As stable a lateral guidance as possible in the thickness direction of an inner link member, which is formed by the presented inner link, on a roller tooth with a short tooth height can be achieved in that the side edge portion with the greater distance away from the connecting straight line runs rectilinearly parallel to the latter. The rectilinear side edge portion can then lie in a stabilizing manner as a tangent against a, for example, doubly conical, roller body of the chain guiding roller.

In contrast to the chain guiding roller, a pinion body situated radially within the teeth of a pinion does not contribute to the guiding of the chain on the pinion. In order to save weight, on the one hand, and for easier production of a meshing engagement with a pinion during a shifting operation, on the other hand, preferably the opposite side edge portion having the smaller distance away from the longitudinal center of the connecting straight line is therefore designed in such a manner that it first of all along its profile in the longitudinal direction approaches the connecting straight line and then moves away from the latter again. This constriction makes it possible to reduce the amount by which the connecting straight line of the inner link has to be raised over a pinion tooth tip in order, particularly during the shifting operation onto a pinion of larger diameter, to shift the pinion tooth tip, which is initially situated outside an inner link member in the thickness direction, into the region between the two inner links.

An advantageous engagement situation both with pinion teeth and with roller teeth of the chain guiding roller can be achieved by the fact that the location of the minimum distance value is situated closer in the width direction to a side edge portion of the inner link, which side edge portion runs between the connecting openings in the longitudinal direction, than the connecting straight line. In case of doubt, the distance between the location of the minimum distance value and a side edge portion should be determined in the longitudinal direction wherever the side edge portion has approached the connecting straight line to the greatest extent in the width direction.

In order to be able to use the depression region of an inner link as an insertion aid of a tooth into the inner link intermediate space or/and as an approximately negative form fitting contour of a tooth already introduced into the inner link intermediate space, in the width direction on both sides of the connecting straight line, in each case at a distance from the location of the minimum distance value, there can be in each case a location of a maximum distance value at which the distance, which occurs on the respective side of the connecting straight line on the inner side of the inner link and is to be measured in the longitudinal direction, between the two flat surfaces is greatest. For clarity, it should be emphasized that each of the two maximum distance values is greater in terms of amount than the minimum distance value. On account of the asymmetry, which exists in the width direction of the inner links, of the presented inner link, the distance of the location of the minimum distance value away from the respective locations of the maximum distance values preferably differs in size.

The depression region preferably completely passes through the inner link in the width direction.

The location of the minimum distance value can be merely a virtually point shaped location in the width direction without a significant dimension in the width direction, or it can be a minimum distance value range extending over a predetermined distance in the width direction.

In principle, an edge of a flat surface in the region between the connecting openings can have a curved profile, and also the radially outer edges of the chain rollers lying with their end sides against the flat surfaces can have a curved, namely circular profile. During the engagement of a pinion tooth or else of a roller tooth in an inner link intermediate space, it can be overall advantageous for the stability of the inner link member formed by the presented inner links and therefore of a bicycle chain having such inner link members if at least one flat surface protrudes radially over the cylindrical outer surface of a chain roller with respect to a center axis, running in the thickness direction, through the connecting openings. This makes it possible to prevent that, during the production of a meshing engagement between tooth and inner link member, a portion of the tooth tip penetrates between chain roller and inner link and thus possibly expands or even breaks the inner link member in the thickness direction. Said advantageous local radial protrusion of the flat surface over the chain roller can be provided by the fact that, in a longitudinal region of the inner link situated between the connecting openings, the edge of at least one flat surface runs in the width direction rectilinearly at least in portions or with a greatest radius of curvature along the surface edge encircling the connecting opening. For the reasons mentioned, the edges of the two flat surfaces preferably run rectilinearly at least in portions on both sides of the depression region in the longitudinal region of the inner link.

Whenever, in said longitudinal region, the edges of the two flat surfaces run rectilinearly at least in portions, the rectilinear edge portions of the edges of the flat surfaces can run parallel to one another at least in portions. The width portion in which the rectilinear edge portions of the edges of the flat surfaces run, then preferably forms the abovementioned minimum distance value region. This is of advantage, for example, if the pinion arrangement interacting with the inner link has numerous pinion teeth of differing tooth height. The depression region can then continue to serve as an insertion aid for said different pinion teeth into the inner link intermediate space and, for a multiplicity of different pinion teeth, is formed after production of the meshing engagement, for the defined arrangement of said pinion teeth in the inner link intermediate space.

Whenever, in said longitudinal region, the edges of the two flat surfaces run rectilinearly at least in portions, a very precise guidance of the inner link members and therefore of the chain by the inner link by way of pinion teeth tapering towards the tooth tip can be provided by the fact that the distance, which is to be recovered in the longitudinal direction, of the rectilinear portions is reduced at least in portions from edges of the flat surfaces in the width direction as they approach closer to the location of the minimum distance value. Although this reduction can also take place in a stepwise manner, a continuous stepless reduction of said distance is preferred in respect of the contour of the pinion tooth, but also roller tooth, which enters into the inner link intermediate space and is temporarily accommodated there.

For the engagement with the pinion teeth and also with the roller teeth on both sides of the location of the minimum distance value, rectilinearly running portions of the edges of the flat surfaces can be formed, the distance of which portions is reduced in the longitudinal direction as they approach the location of the minimum distance value.

In order, firstly, to be able to adapt the profile of a flat surface to the configuration of the chain roller lying thereagainst and in order, secondly, to be able to provide an edge of the flat surface, which edge is as kink free or/and as jump free as possible and therefore promotes entry of a tooth into the inner link intermediate space, in a longitudinal region of the inner link, which longitudinal region is situated between the connecting openings, the edge of at least one flat surface can run in the width direction in a manner curved continuously in the same direction. The profile of the edge of the flat surface can then be particularly readily adapted to the contour, which tapers towards the tooth tip, in particular of a pinion tooth if the curved profile of the edge of the flat surface is assigned changing radii of curvature along the width direction. The radii of curvature preferably become smaller with increasing distance from the location of the minimum distance value, —i.e. the curvature of the respective edge portion becomes greater. Then, in addition, the abovementioned radial protrusion of the flat surface over the cylindrical circumferential surface of a chain roller assigned to the flat surface for contact therewith can also be realized with a curved edge profile. This preferably holds true for both flat surfaces of the inner link.

In principle, it should not be ruled out that the depression region is of convexly curved design in a width region containing the connecting straight line, when looking at the inner link inner side, for example is curved about an axis of curvature parallel to the connecting straight line. However, a greater inner link intermediate space available for receiving a tooth can be obtained with a depression region which, in a width region containing the connecting straight line, has a flat surface region. In principle, said flat surface region can be inclined. To facilitate the introduction of a tooth into the inner link intermediate space, the inclination, if it is present, is preferably such that the link distance, to be measured in the thickness direction, of the flat surface regions of two inner links lying mirror symmetrically opposite each other of one and the same inner link member becomes greater towards a side edge away from the minimum distance value in the width direction. However, a flat surface region which is orthogonal with respect to the thickness direction is preferred for providing as large a receiving volume as possible of the inner link intermediate space.

The flat surface region, following the presented asymmetry of the inner link, is preferably arranged offset towards a side edge region relative to the connecting straight line in the width direction. The flat surface region is preferably arranged offset towards that side edge region which is situated closer to the location of the minimum distance value, and therefore an insertion slope having a greater dimension in the width direction can be provided on the side edge portion on the inlet side for the pinion tooth than on the side edge portion on the inlet side for the roller tooth, for example in the form of a chamfering. This facilitates the introduction of a pinion tooth into the inner link intermediate space.

For simple but reliable definition of the distance between two inner links forming an inner link member and also furthermore as a defined axle formation which can rotatably receive a chain roller, according to an advantageous development the connecting openings are radially surrounded within the flat surfaces surrounding them in each case by sleeve portions. The sleeve portions protrude in the thickness direction of the inner links over the flat surfaces surrounding said sleeve portions.

In order to obtain a bicycle chain which is as slender as possible in the thickness direction of the links forming the latter, the outer side of the inner link that is opposite the inner side preferably has a flat outer surface which both extends in the longitudinal direction between the connecting openings, where, during a shifting operation, a side surface of a pinion tooth of a pinion coming into engagement by means of the shifting operation can enter into contact engagement, and also at least partially surrounds the connecting openings where inner side regions of an outer link can come into contact with the completely mounted bicycle chain. The flat outer surface preferably completely surrounds the connecting openings.

It is indeed in principle not ruled out that the outer side of the inner link also has, in addition to the flat outer surface, a further, non-flat outer surface. However, in order to obtain the abovementioned slender bicycle chain, it is preferred that the outer side is free from projections which protrude over the flat outer surface in the thickness direction.

By contrast, it should not only not be ruled out, but it is even preferred that the outer side of the inner link has hollows or depression surrounding the connecting openings and in which corresponding projections on inner sides of outer links can engage in order to position the inner link and an outer link adjoining the latter relative to each other. In order also to obtain a centering effect, the depressions are preferably formed tapering in a direction away from the flat outer surface. For example, the depressions can have a negatively frustoconical configuration.

For the proposed inner link, it then advantageously does not matter for the running direction of the bicycle chain formed with the participation of said inner link if the inner side or/and the outer side, preferably the entire inner link, is mirror symmetrical with respect to a plane of symmetry orthogonal with respect to the connecting straight line.

The abovementioned object is also achieved by a bicycle chain outer link having two connecting openings which are formed at a distance from each other, pass through the outer link in the thickness direction thereof and are each designed for receiving a connecting component in order to connect the outer link to a further outer link in order to form an outer link member of a bicycle chain, wherein a connecting straight line connecting respective center axes of the connecting openings defines a longitudinal direction of the outer link, and wherein a direction orthogonal both with respect to the longitudinal direction and with respect to the thickness direction is a width direction of the outer link, wherein the outer link has, on its inner side facing the further outer link of the same outer link member in the completely mounted state in a bicycle chain, two flat surfaces which are provided at a distance from one another in the longitudinal direction of the outer link and are separated by a depression region, which is placed in the longitudinal direction between them, of which each flat surface surrounds another of the connecting openings, wherein the depression region is set back with respect to the flat surfaces towards an outer side of the outer link that is opposite the inner side, wherein, in a minimum distance region containing the connecting straight line and extending in the width direction, the distance, to be measured in the longitudinal direction, between the flat surfaces is minimal, wherein the distance between the flat surfaces starting from the minimum distance region becomes larger towards each of the two side edges bounding the outer link in the width direction.

Such an outer link can facilitate the introduction of a pinion tooth into the outer link intermediate space. The depression regions of outer links which are opposite one another in the thickness direction and are connected by connecting components to form an outer link member of a bicycle chain form a region on the outer link member, in which region the outer link member has a greater link distance, to be measured in the thickness direction, than, for example, in the region of the flat surfaces which are designed for contact against outer sides of inner links. By means of the expansion of the depression regions in the approach towards the side edges bounding the outer link in the width direction, the depression regions can act as introduction funnels for pinion teeth, and starting from virtually any arrangement of a pinion tooth tip in the entry region of an outer link intermediate space, can guide pinion teeth into said intermediate space.

What has been stated at the beginning with regard to the connecting components of inner link members holds true for the connecting components of outer link members.

The distance between the flat surfaces does not have to become smaller continuously from the side edge as far as the minimum distance region. It is entirely sufficient if a change in the distance between the flat surfaces substantially takes place in a region situated close to the respective side edge. As a result, an advantageously stiff outer link can be obtained. Depending on how the edge of the respective flat surfaces runs in the region in which the flat surfaces are adjacent to the depression region in the longitudinal direction, an outer link which both promotes the entry of a pinion tooth into the outer link intermediate space and is also advantageously stiff can be obtained in that, for at least one width region of the outer link, it holds true that a distance, to be measured in the longitudinal direction, between potions of edges, which are adjacent to the depression region, of the flat surfaces changes more greatly in the 50%, preferably 30%, particularly preferably 10% of the width dimension of the width region that is situated closest to the longitudinal center of the side edge than in the 30%, preferably 40%, particularly preferably 50% of the width dimension of the width region that is situated closest to the connecting straight line.

Said width region of the outer link extends from the connecting straight line parallel to the width direction as far as the longitudinal center of a side edge. Consequently, the outer link has two width regions, one on each side of the connecting straight line. What has been stated above preferably holds true for both width regions of an outer link.

For a bicycle chain, it is important that inner and outer link members which are connected to one another in an articulated manner via a connecting component can be safely bent about the axis of the connecting component. The neat revolution of the chain around sprockets, pinions and rollers of different diameters can thereby be ensured. This ensures that the bicycle chain remains in engagement with the respective tooth carrying components of the bicycle and is not inclined, for example, to jump from a sprocket or a pinion. One reason for an undesirable stiffening of a bicycle chain within the context of increased bending resistance is a penetration of particles into the region between surface portions of inner and outer link lying against one another.

A configuration of the outer link which promotes both entry of a pinion tooth into the outer link intermediate space and also counteracts entry of particles between said surface portions of inner and outer link can advantageously be achieved by the fact that the distance between the flat surfaces on the inner side of the outer link increases more greatly in the direction of the one side edge on a first side of a reference plane orthogonally intersecting the connecting straight line in its longitudinal center than on the opposite, second side of the reference plane. As a result, the edge of a flat surface can run congruently with the outer edge of an end portion of an inner link, said end portion lying against said flat surface, and the edge of the second flat surface, which is situated away in the longitudinal direction, can protrude with respect to a center axis, running in the thickness direction, of the connecting opening, which is surrounded by said flat surface, radially over the outer edge of an end portion of another inner link, said end portion lying against said other flat surface. This radial protrusion prevents particles which are entrained, for example, by way of a soiled pinion tooth tip from approaching the gap existing between outer link and inner link.

Said radial protrusion does not exist, or exists in a smaller extent, on the first mentioned flat surface on the inner side of the outer link and that end portion of the inner link which lies there against. Nevertheless, even in the case of congruent edges of the flat surface of the outer link inner side and end portion of the inner link outer side, which edges are preferably chamfering free in order to avoid dirt entering the gap between the inner and outer link, a narrow gap size between the flat surface and end portion of the inner link can still be maintained. This counteracts the entry of particles or even of a portion of a tooth tip into the gap. In the event of a congruent design, in said region both the edge of the flat surface of the outer link inner side and the outer edge of the adjacent end portion of the inner link outer side are preferably formed in a circular manner with the center axis of the connecting component as center axis of the circular configuration. The congruence of the edge portions is then maintained over a predetermined relative movement portion of inner and outer link irrespective of a relative rotation of outer link and inner link.

The distance preferably also increases to a differing extent in the opposite direction towards the respective other side edge on the different sides of the reference plane, specifically particularly preferably to a greater extent on the second side of the reference plane than on the first side thereof.

Tapering of the depression region from a side edge portion in the width direction towards the connecting straight line can be obtained under the abovementioned boundary conditions of an outer link which is not mirror symmetrical and has advantageously jump and kink free edges of a flat surface in a region adjacent to the depression region in that, for the flat surface, it holds true that a region of the edge of the flat surface that is adjacent to the depression region is curved to a differing degree in the width direction on different sides of the connecting straight line. This preferably holds true for the two flat surfaces of the inner side of the outer link, which flat surfaces each surround a different connecting opening.

A radial protrusion of a flat surface on one side of the connecting straight line and a smaller radial protrusion or a profile of the edge of the flat surface, which profile is congruent with the outer edge of the adjacent inner link, on the other side of the connecting straight line can be obtained in that, for the flat surface, it holds true that that region of the edge of the flat surface that is adjacent to the depression region has a curved profile in portions in the width direction on one side of the connecting straight line and a rectilinear profile in portions on the other side. This preferably holds true for the two flat surfaces. This will be explained using the example of a chain joint which is formed by an outer link member and an inner link member which is connected to the latter and trails in the driving direction of rotation of the chain ring formed by the bicycle chain. On account of the trailing in the driving direction of rotation, the chain roller of the chain joint and optionally outer edge regions of the inner links holding the chain roller between them in the width direction are permanently in torque transmitting contact engagement with a pinion tooth during a meshing engagement with a pinion. It can be advantageous there to form the flat surfaces of the outer link inner sides, which flat surfaces surround the connecting openings involved in the formation of said chain joint, on that side of the chain joint which faces the pinion axis, i.e. which are situated radially on the inside on the chain ring, with a high radial protrusion with respect to the outer edges of those end regions of inner link outer sides which lie thereon. By contrast, on that side of the chain joint which is situated radially on the outside of the chain ring, and also on that side of the chain joint, which leads in the driving direction of rotation, of the same outer link member that is situated radially on the inside, the mechanically less greatly loaded edges, which are therefore also less greatly exposed to a risk of soiling, of the flat surfaces can be formed with a smaller radial protrusion or congruently with the outer edge of the adjacent inner link end regions. Consequently, on the leading chain roller with respect to the observed outer link intermediate space, an enlarged entry region into the intermediate space is provided for a pinion tooth on the radially inner side of the chain ring.

The outer link can therefore be designed in accordance with the above explanations in such a manner that a curved edge region portion of the respective other flat surface lies opposite that edge region portion which is rectilinear in portions in the longitudinal direction. Conversely, the same preferably holds true for the curved region of the edge of the same flat surface, i.e. that a rectilinear portion of an edge of the other flat surface lies opposite said curved region in the longitudinal direction.

In principle, for easier introduction of a pinion tooth into the outer link intermediate space, it is advantageous if, in a first width region of the outer link, which width region extends from the connecting straight line parallel to the width direction as far as the longitudinal center of the one side edge, the distance between edge portions of the flat surfaces that are adjacent to the depression region is at a maximum in the region of the longitudinal center of the one side edge. For easier production of an engagement even of a roller tooth with the outer link intermediate space, with the roller tooth, by comparison with a pinion tooth, entering the outer link intermediate space from the opposite direction in the width direction, it can therefore be advantageous if in a second width region of the outer link, which width region extends from the connecting straight line parallel to the width direction in the opposite direction as far as the longitudinal center of the other side edge, the distance between edge portions of the flat surfaces that are adjacent to the depression region is at maximum in the region of the longitudinal of the other side edge. To facilitate the mounting of such an outer link during the production of a bicycle chain, the maximum distances in the first and in the second width region are preferably identical in size in terms of amount.

To facilitate an accurately fitting arrangement of outer link and inner link during the production of a bicycle chain, each of the connecting openings of the outer link on the inner side is preferably surrounded radially within the flat surface surrounding them by a projection protruding in the thickness direction over the respective flat surface. On the finished bicycle chain, said projection preferably projects into the abovementioned depression on the outer side of an inner link and thus defines the relative position of outer link and inner link with respect to their connecting openings, which are each aligned in order to form a chain joint. The projection is preferably designed tapering in a direction away from the respective flat surface, and therefore, in particular in interaction with a depression tapering in the thickness direction into the inner link, said projection can deploy a centering effect. The projection is preferably frustoconical.

Whenever the outer link has a depression region which is not mirror symmetrical, to facilitate the mounting of said outer link, it is nevertheless preferably provided that the inner side or/and the outer side, preferably the entire outer link, is point symmetrical with respect to an axis of symmetry intersecting the connecting straight line in the longitudinal center thereof and running in the thickness direction. Symmetry present on the outer link eliminates the possibility of an erroneous arrangement of the outer link on the bicycle chain.

For the facilitated mounting of the outer link with a considerably reduced risk of error, it is therefore particularly preferred that the inner side or/and the outer side, preferably the entire outer link, is mirror symmetrical both with respect to a first plane of symmetry orthogonally intersecting the connecting straight line in the longitudinal center thereof and with respect to a second plane of symmetry running in the thickness direction and containing the connecting straight line.

In addition, the present invention relates to a chain ring, comprising a bicycle chain revolving in a self-contained manner and having outer and inner link members following one another in an alternating manner in the revolving direction, wherein the inner link members are formed from two asymmetric inner links, as described above, or/and wherein the outer link members are formed from two outer links designed as described above. Such a chain ring also embodies the technical advantages associated with the present invention and achieves the object mentioned at the beginning on account of the use of the links presented above.

As has already been described in detail above, the above described asymmetric inner link serves especially for forming preferred inner link members which, with their one side edge, permit an extremely advantageous meshing engagement with a pinion of a rear wheel pinion cassette and which, with their side edge respectively opposite in the width direction, permit a particularly advantageous engagement with a chain guiding roller of a derailleur. Inner link members consisting of inner links, the two side edge portions of which are at a distance of differing size from the connecting straight line in the width direction, are arranged on the chain ring, in order to obtain the advantageous engagement situations mentioned both with pinions and with the chain guiding roller, in such a manner that the side edge portions at the greater distance from the connecting straight line are arranged lying radially on the outside of the chain ring. This is because, during a revolution of the chain ring on a bicycle, the radially outer side of the chain ring is situated closer to a body of the chain guiding roller, while, during said revolution, the radially inner side of the chain ring is situated closer to a body of the meshing pinion of the rear wheel pinion arrangement.

In an embodiment, a bicycle chain inner link has two connecting openings which are formed at a distance from each other, pass through the inner link in the thickness direction thereof and are each designed for receiving a connecting component in order to connect the inner link to a further inner link in order to form an inner link member of a bicycle chain, wherein a connecting straight line which connects respective center axes of the connecting openings defines a longitudinal direction of the inner link, and wherein a direction orthogonal both with respect to the longitudinal direction and also with respect to the thickness direction is a width direction of the inner link, wherein the inner link has, on its inner side facing the further inner link of the same inner link member in the completely mounted state in a bicycle chain, two flat surfaces which are provided at a distance from each other in the longitudinal direction of the inner link and are separated by a depression region, which is placed in the longitudinal direction between them, and of which each flat surface surrounds another of the connecting openings, wherein the depression region is set back with respect to the flat surfaces towards an outer side of the inner link that is opposite the inner side.

In FIG. 1, a bicycle is denoted in general by 10. The bicycle 10 comprises a bicycle frame 12 with a front wheel 14, a rear wheel 16, handlebars 18 and a saddle 20. As customary in the case of bicycles, torque can be introduced on the bicycle 10 via pedals 22 and cranks 24 into a front sprocket 26 which is transmitted via a bicycle chain 30, which revolves in a self-contained manner in the form of a chain ring 28, to a multiple pinion arrangement 32 on the rear wheel 16. During forwards travel, the bicycle chain 30 revolves in the clockwise direction in FIG. 1 along the driving direction of rotation D.

The pinion of the multiple pinion arrangement 32 on the rear wheel 16 that meshes in each case with the bicycle chain 30 can be selected in a manner known per se by means of a derailleur 34 which is movable along the rear wheel axle A. This is not intended to mean that the derailleur 34 is movable only along the rear wheel axle A. On the contrary, it is also movable along the rear wheel axle A.

The derailleur 34 comprises a chain tensioning roller 36 which is situated further away from the pinion arrangement 32 and ensures that the chain ring 28 does not have any slack. The derailleur 34 furthermore comprises a chain guiding roller 38 which is situated closer to the pinion arrangement 32 and positions the chain 30 or the chain ring 28 along the rear wheel axle A with respect to the pinion arrangement 32.

The bicycle chain 30 is formed in a manner known per se by a plurality of outer link members 40 which follow one another in the longitudinal direction L of the chain and between which a respective inner link member 42 is arranged which connects the outer link members 40 to one another.

Figure 2:
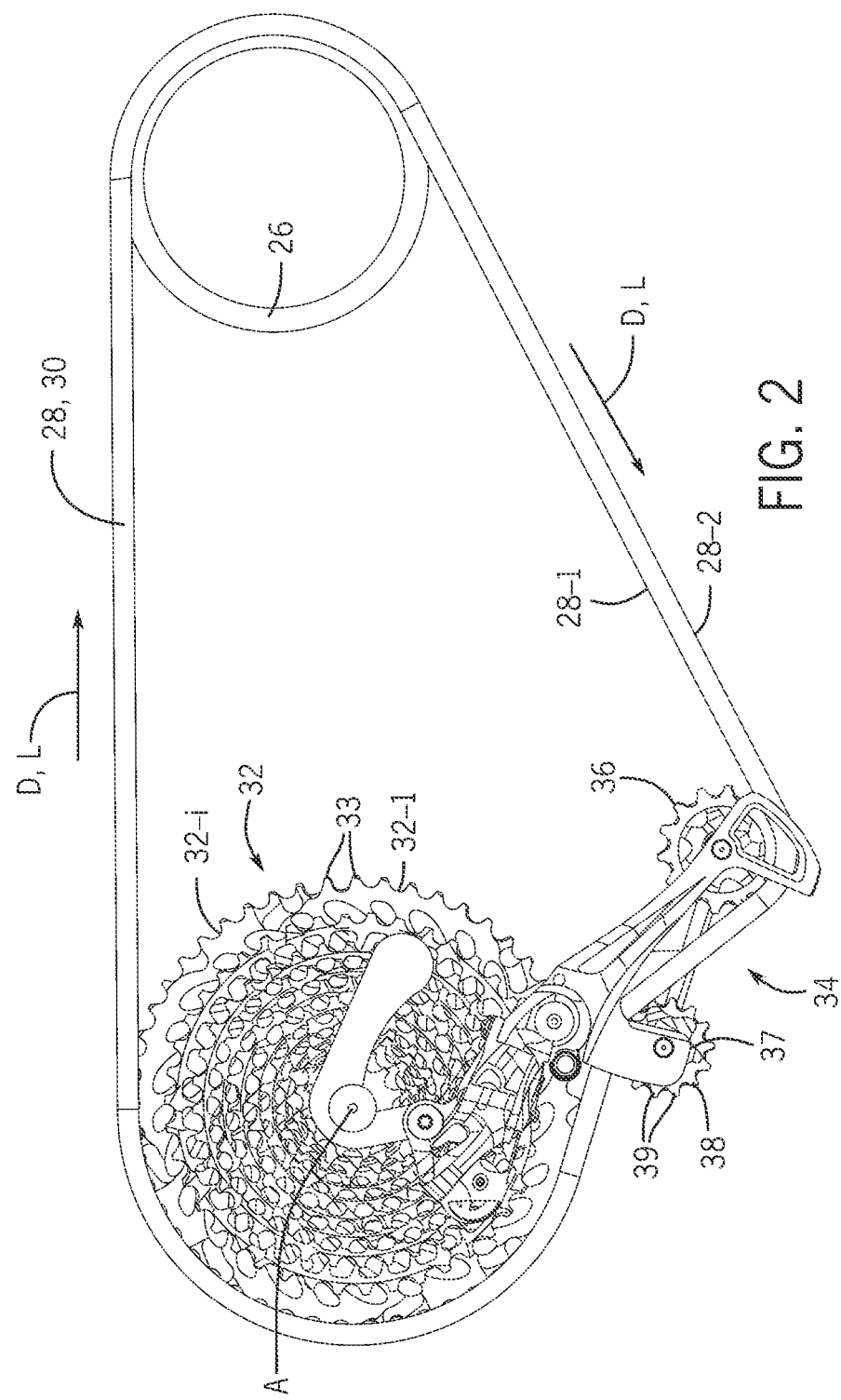
FIG. 2 illustrates a schematic side view of a drive assembly consisting of chain ring, front sprocket, rear pinion arrangement and rear derailleur from FIG. 1, in a view in a direction parallel to the rear wheel axle.

In FIG. 2, the front sprocket 26 and the chain ring 28 are illustrated merely in roughly schematic form. But the derailleur 34 and the pinion arrangement 32 are illustrated in more detail than in FIG. 1.

In the example illustrated, the pinion arrangement 32 is an 11 times pinion arrangement 32 having 11 coaxial pinions 32 i, where i=1 to 11. In FIG. 2, the bicycle chain 30 meshes with the pinion 32 1 of largest diameter. From each of the pinions 32 1, pinion teeth 33 protrude radially outwards with respect to the rear wheel axle A. Roller teeth 39 are formed on the chain guiding roller 38, which roller teeth protrude, with respect to the axis of rotation of the chain guiding roller 38, radially from a roller body 37 of the chain guiding roller 38. In a departure from the schematic illustration of FIG. 2, the pinion teeth 33 can have a greater tooth height than the roller teeth 39.

The revolving chain ring 28 has a radially inner side 28 1 and has a radially outer side 28 2 further away from the area enclosed by the chain ring 28. As can be seen in FIG. 2, the front sprocket 26, the pinions 32 i and the tensioning roller 36 mesh with the revolving chain ring 28 in such a manner that the teeth thereof each engage in the intermediate spaces of the link members 40 and 42 from the radially inner side 28 1 of the chain ring 28. By contrast, the teeth 39 of the chain guiding roller 38 enter the intermediate spaces of the link members 40 and 42 from the radially outer side 28 2.

Figure 3:
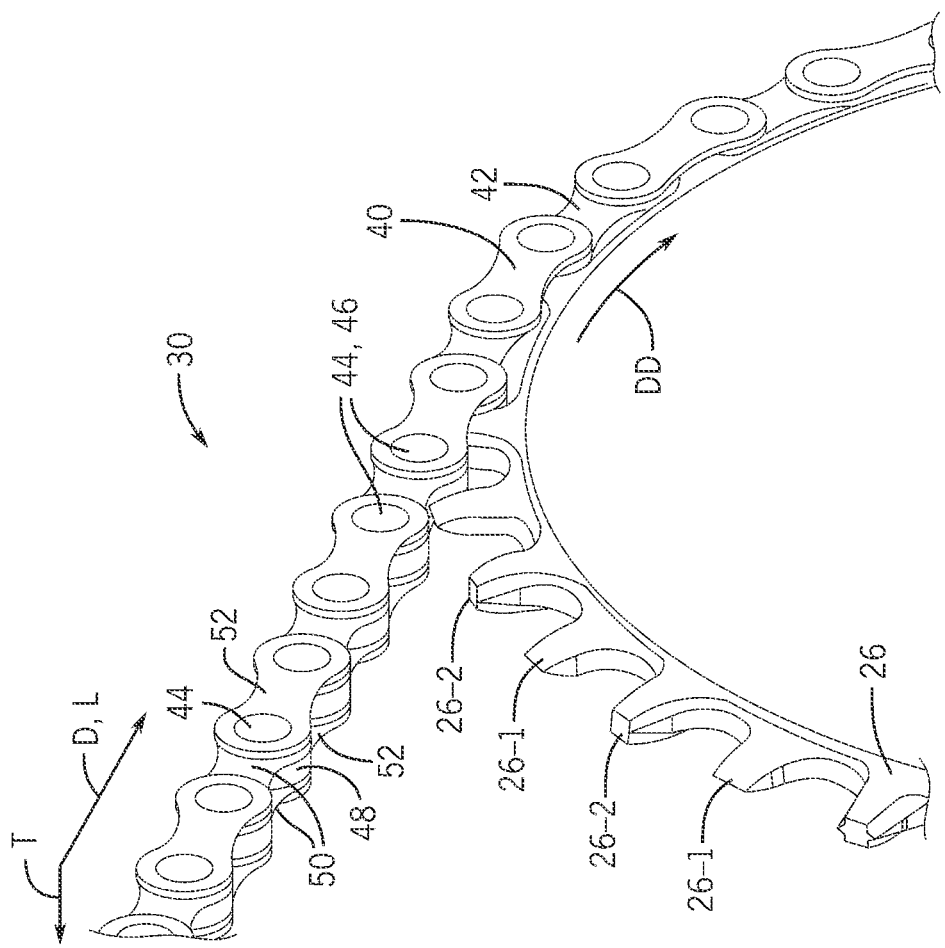
FIG. 3 illustrates a perspective view of a meshing engagement of the chain ring of FIGS. 1 and 2 with the front sprocket.

For further explanation, FIG. 3 illustrates a meshing engagement of the bicycle chain 30 with the front sprocket 26. The sprocket 26 is driven in the direction of rotation DD by the cyclist via the pedals 22 and the cranks 24, as a result of which teeth 26 1 and 26 2 successively enter into engagement with outer link members 40 and inner link members 42. The teeth 26 1 are each shaped identically, as are the teeth 26 2. The teeth 26 1 are thinner here than the teeth 26 2 of the sprocket 26. Accordingly, the teeth 26 1 are provided for engagement in the narrower inner link intermediate space and the teeth 26 2 for engagement in the wider outer link intermediate space.

The outer link members 40 and the inner link members 42 are each connected to one another via a connecting pin 44, wherein link members 40 and 42 directly connected to one another by a connecting pin 44 can be angled around the connecting pin 44 and therefore form a chain joint 46 at the connecting pin 44. In the thickness direction T of the link members 40 and 42 or of the bicycle chain 30, a chain joint 46 comprises a central rotatable chain roller 48 which is enclosed in the thickness direction T on both sides by a respective inner link 50. In the thickness direction T in turn, the two inner links 50 of an inner link member 42 are each adjacent on their side facing away from the chain roller 48 to an outer link 52. The two outer links 52 of an outer link member 40 are preferably formed and arranged mirror symmetrically with respect to a mirror plane orthogonal to the thickness direction T. Similarly, the inner links 50 of an inner link member 42 are preferably formed and arranged mirror symmetrically with respect to said mirror plane.

The bicycle chain 30 shown in FIG. 3 reproduces said links only in roughly schematic form. Details of the configuration of the links 50 and 52 are explained in the following figures.

Figure 4A:
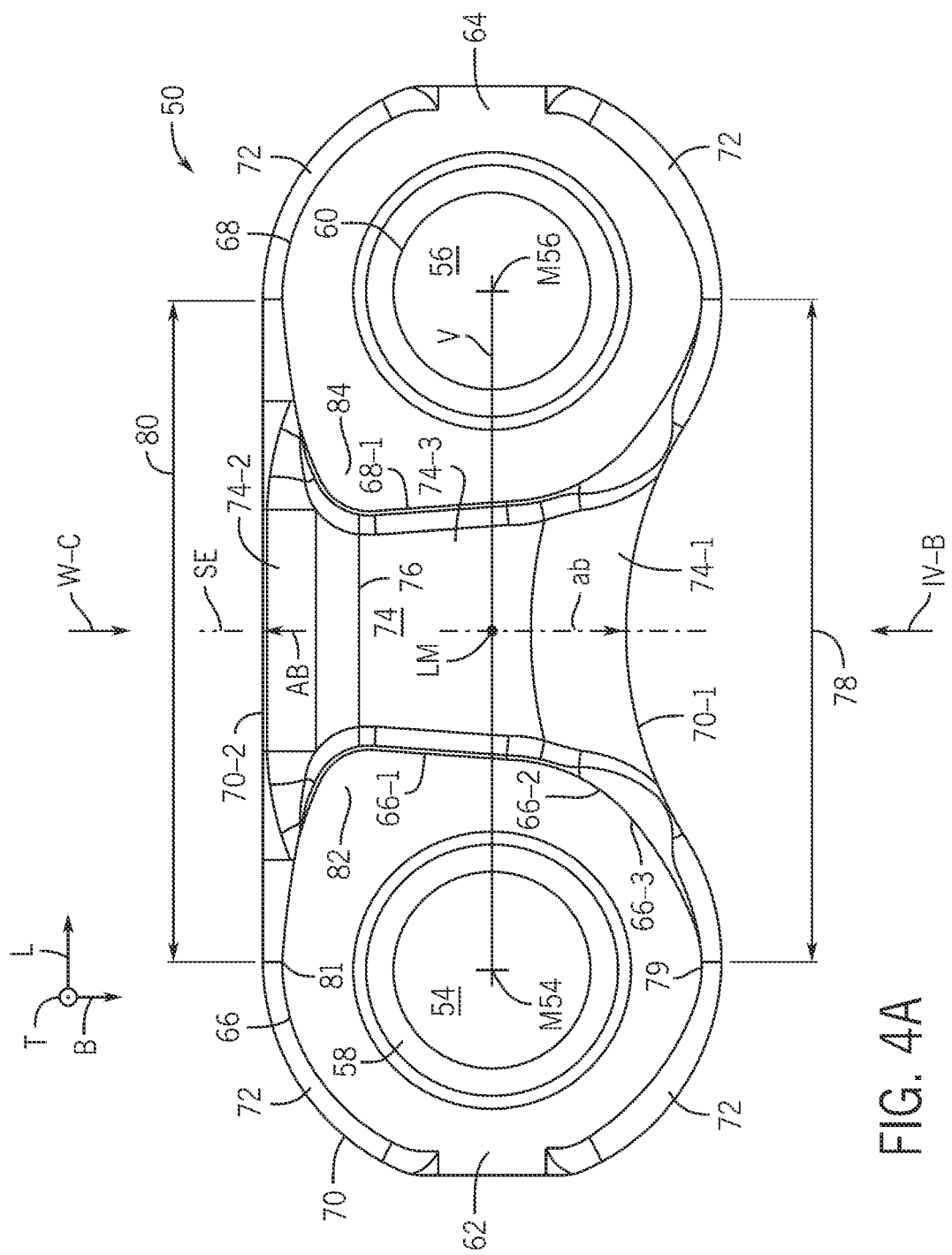
FIG. 4A illustrates a schematic elevation view of a first embodiment of an inner side of an inner link of the chain ring of FIGS. 1 to 3, in a view in a direction parallel to the thickness direction T.
Figure 4B:
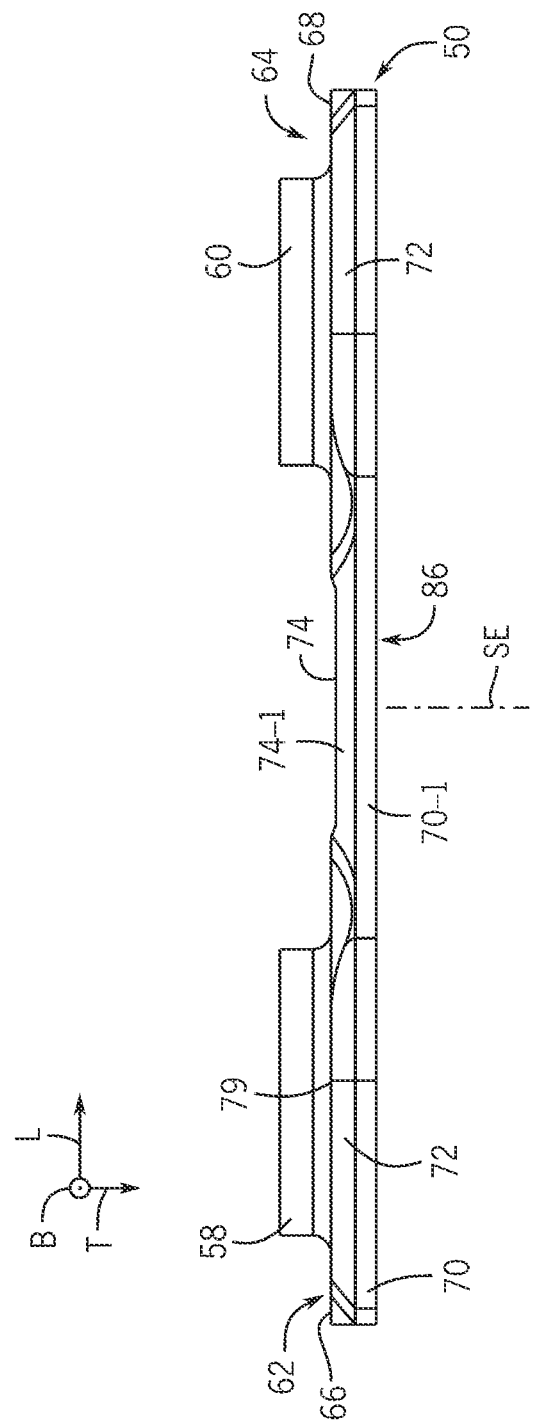
FIG. 4B illustrates a schematic bottom view of the inner link from FIG. 4A, in a view along the arrow IV-B in FIG. 4A.
Figure 4D:
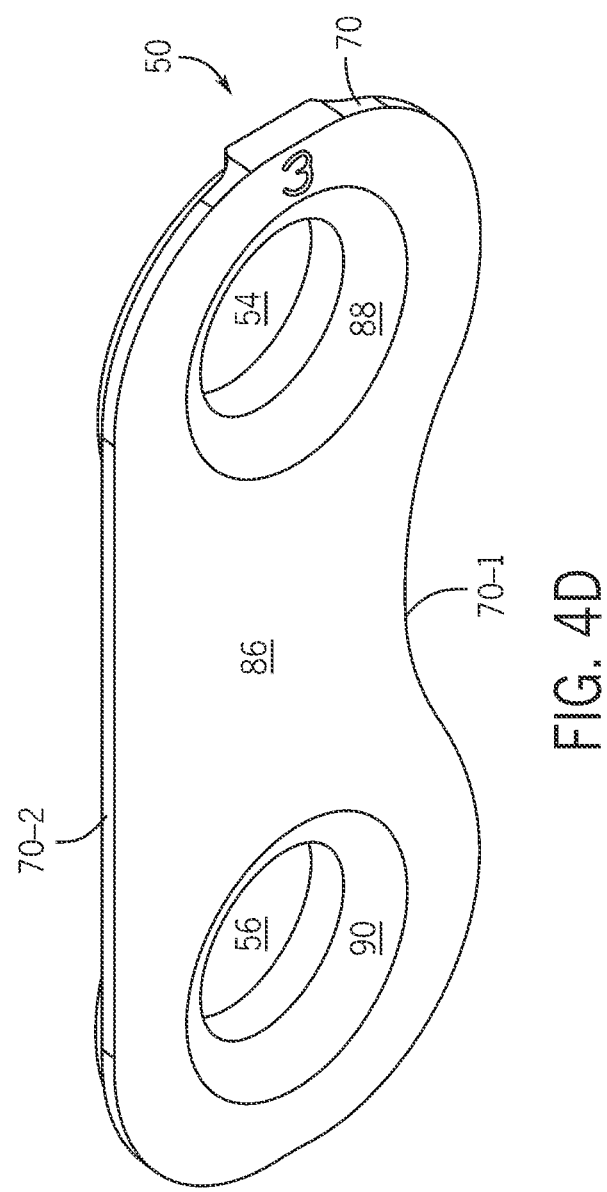
FIG. 4D illustrates a schematic perspective view of the outer side of the inner link from FIG. 4A.

FIGS. 4A to 4D show a first embodiment of an inner link 50. FIG. 4A shows a top view of an inner side, which faces an opposite, identical inner link 50 in the inner link member 42, when looking at said inner side along the thickness direction T. FIG. 4B shows a view of the inner link 50 along the width direction B, when looking at that side of the inner link 50 which forms the radially inner side 28 1 of the chain ring 28, along the arrow IV B from FIG. 1. FIG. 4C shows a view of the inner link 50 likewise along the width direction B, but from the opposite direction as in FIG. 4B, i.e. when looking at that side of the inner link 50 which forms the radially outer side 28 2 of the chain ring 28, along the arrow IV C from FIG. 1. FIG. 4D shows a perspective view of the outer side opposite the inner side from FIG. 4A in the thickness direction T.

FIG. 4A shows two connecting openings 54 and 56 which, in the completely mounted state of the bicycle chain 30 or of the chain ring 28, are each passed through by a connecting component in an exemplary configuration of a connecting pin 44. Center axes passing centrally through the connecting openings 54 and 56 and running parallel to the thickness direction T are denoted by M54 and M56, respectively. A connecting straight line V which connects the two center axes M54 and M56 and is orthogonal with respect to the two center axes M54 and M56 forms a reference straight line in the description of the inner link 50. The connecting straight line V defines a longitudinal direction L of the inner link 50, said longitudinal direction on the completely mounted bicycle chain 30 always coinciding with the local longitudinal direction L of the bicycle chain 30.

The connecting straight line V extends from the center axis M54 as far as the center axis M56. Since the inner link 50 is of mirror symmetrical design with respect to a plane SE orthogonally intersecting the connecting straight line V in its longitudinal center LM, the description of half of the inner link 50 suffices. The respective other half is apparent from said condition of mirror symmetry.

Each of the connecting openings 54 and 56 is surrounded by a sleeve like collar 58 or 60 which, on the finished inner link member 42, forms part of an axle which rotatably supports the chain roller 48 assigned to the respective connecting opening. Each sleeve like collar 58 or 60 is surrounded by a flat surface 62 or 64, against which the chain roller 48 assigned to the respective connecting opening 54 or 56 lies with its preferably likewise flat end side or at least lies opposite said surface.

The flat surface 62 is bounded radially outward by an edge 66, and the flat plane 64 by an edge 68. The edges 66 and 68 can be located closer to the respective surrounding connecting openings 54 and 56, respectively, than an edge 70 of the inner link 50 since chamferings 72 can be situated between the edge 70 of the inner link 50 and the edges 66 and 68 of the flat surfaces 62 and 64.

Between the connecting openings 54 and 56, a side edge portion 70 1 of the inner link edge 70 extends on the side assigned to the radially inner edge 28 1 of the chain ring 28, and a side edge portion 70 2 of the inner link edge 70 extends on the side assigned to the radially outer edge 28 2 of the chain ring 28.

The side edge portions 70 1 and 70 2 are at differing distances from the connecting straight line V in the width direction B. In case of doubt, the distance of a side edge portion should be determined as the distance from the longitudinal center LM of the connecting straight line V. From the latter, the side edge portion 70 1 which is concave when viewing the radially inner side 28 1 of the chain ring 28 is at the shorter distance "ab" away from the longitudinal center LM of the connecting straight line V. By contrast, the opposite side edge portion 70 2 is at the greater distance "AB" away from the longitudinal center LM of the connecting straight line V.

A depression region 74 is formed in the region between the flat surfaces 62 and 64, said depression region being set back with respect to the flat surfaces 62 and 64 towards the outer side of the inner link 50. By contrast, the flat surfaces 62 and 64 lie in a common plane. The depression region 74 together with the depression region 74 of the opposite inner link 50 of an inner link member 42 forms a substantial part of an inner link intermediate space.

Past the side edge portion 70 1, a pinion tooth 33 enters the inner link intermediate space in the region of the depression portion 74. Past the side edge portion 70 2, a roller tooth 39 of the chain guiding roller 38 enters the inner link intermediate space in the region of the depression portion 74. Independently of on which pinion 32 i the pinion tooth 33 is formed, the latter generally has a greater tooth height than a roller tooth 39.

In order, even in the case of a shorter tooth height of a roller tooth 39, to be able to readily guide an inner link member 42 on the guide roller 38 although the bicycle chain 30 only has a very small dimension in the thickness direction T of the chain links, the side edge portion 70 2 is of rectilinear design and is further away from the connecting straight line V than the opposite side edge portion 70 1. Therefore, even in the event of a short tooth height of a roller tooth 39, a large overlap between the roller tooth 39 and the inner link 50 in the width direction B can be achieved. In addition, the rectilinear side edge portion 70 2, which is preferably parallel to the connecting straight line V, can lie as a tangent against a conical lateral surface of a roller body 37, frequently in the form of a double truncated cone, of the chain guiding roller 38. The roller body 37 generally tapers here from the plane of the roller teeth 39 axially towards the two opposite sides. Each side edge portion 70 2 of two inner links 50 forming an inner link member 42 can therefore lie against another truncated cone of the roller body 37.

The reference number 76 denotes the location of the smallest distance in the longitudinal direction L between the edges 66 and 68 of the flat surfaces 62 and 64. Said location 76 of the minimum distance value between the edges 66 and 68 of the two flat surfaces 62 and 64 and therefore between the flat surfaces 62 and 64 is situated closer in the width direction B to the side edge portion 70 2 than the connecting straight line V. As a result, from the side edge portion 70 1, a pinion tooth 33 with a comparatively high tooth height can penetrate the inner link intermediate space, which is essentially provided by the depression region 74, and, via its complete tooth height, is not only optimally guided into the inner link intermediate space, but also is held virtually in a form fitting manner in the inner link intermediate space. The chain 30 is therefore very readily guided by an inner link member 42 on a pinion 32 i and can optimally transmit force, and therefore torque, to the pinion arrangement 32 and therefore to the rear wheel 16.

In the width direction B, the distance in the longitudinal direction between the flat surfaces 62 and 64 increases again on both sides of the location 76 of the minimum distance value between the flat surfaces 62 and 64. In the example illustrated, a location of greatest distance of the flat surfaces 62 and 64 from each other in the longitudinal direction L is in each case present on each side of the connecting straight line V where a distance straight line running in the longitudinal direction lies tangentially against the two edges 66 and 68. This is the location 78 of a maximum distance value on the side of the side edge portion 70 1 and the location 80 of maximum distance value on the side of the side edge portion 70 2. Said maximum distance values at the locations 78 and 80 are preferably identical in size in terms of amount. Similarly, the locations 78 and 80 of the maximum distance values in the width direction B can be equally far away from the connecting straight line V. Consequently, the location 76 of the minimum distance value is also at different distances away from the locations 78 and 80 of the maximum distance values. This also supports the improvement of the guiding of the chain by inner link members 42 on pinions 32 i, on the one hand, and on the chain guiding roller 38, on the other hand. The cost of said improved guidance of the inner link members 42 on the pinions 32 i and on the chain guiding roller 38 is the asymmetry of the inner links 50 in the width direction B.

The edge 66 and the edge 68 of the flat surfaces 62 and 64, respectively, each have a respective rectilinear portion 66 1 and 68 1 which lie opposite each other in the longitudinal direction L because of the abovementioned mirror symmetry of the inner link 50. The rectilinear edge region 66 1 and 68 1 diverge from the location 76 of the minimum distance value towards the side edge portion 70 1. As a result, the depression region 44 in its extent in the longitudinal direction and in the width direction is approximate to the shape of a pinion tooth 33 which customarily tapers towards the tooth tip.

Therefore, in the region of the minimum distance value 76, zones 82 and 84 of a radial protrusion of the flat surface 62 and of the flat surface 64, respectively, over the cylindrical outer casing of the chain guiding roller 38, which is in each case adjacent to the flat surfaces 62 and 64, can be obtained.

From the location 79, which is situated closest to the side edge portion 70 1, of greatest distance of the edge 66 away from the edge 68 of the flat surface 64, which is situated in the longitudinal direction L on the opposite side of the depression region 74, as far as the location 81, which is situated closest to the side edge portion 70 2, of greatest distance away from the edge 68, edge regions of greater curvature (with a smaller radius of curvature) alternate with edge regions of smaller curvature (with a greater radius of curvature). Rectilinear regions are considered here as edge regions of curvature 0, i.e. with an infinitely large radius of curvature. The edge 66 is curved to the greatest extent in the region 82 of the radial protrusion, which permits the radial protrusion with a step and kink free boundary. At the points 79 and 81, the curvature of the edge 66 is in each case greater than in the edge regions directly adjacent to the depression region 74. Starting from the point 79 towards the rectilinear region 66 1, first of all a weak, curved region 66 3 follows, followed in turn by a region 66 2 which is curved to a greater extent and finally leads into the rectilinear region 66 1. The same holds true for the edge 68 because of the mirror symmetry mentioned.

As FIG. 4D shows, the outer side of the inner link 50 has a flat surface 86 which firstly extends in the longitudinal portion between the connecting openings 54 and 56 and which surrounds each of the connecting openings 54 and 56. The flat surface 86 on the outer side of the inner link 50 is preferably a flat surface 86 joined continuously together. Negatively frustoconical hollows or depressions 88 and 90 are formed on the outer side of the inner link 50 in a manner directly surrounding the respective connecting openings 54 and 56.

The material displaced in the region of the depressions 88 and 90 during the deformation of a metal plate to form the inner link 50 has advantageously been used here to form the sleeve like collars 56 and 60. On the finished bicycle chain 30, the depressions 88 and 90 receive corresponding projections on inner sides of outer links 52, which projections, advantageously designed in a positively frustoconical manner, center the connecting openings, which are likewise present on outer links 52 for receiving the connecting pins 54, with respect to the axes M54 and M56. The axes M54 and M56 are simultaneously axes of articulation of the chain joints 46 formed by the respective connecting pins 44, and therefore the centering of inner links 50 and outer links 52 with respect to said axes M54 and M56 is particularly advantageous.

In a width region 74 3 containing the connecting straight line V, the depression region 74 can be configured to be flat and preferably parallel to the flat surface 86 of the outer side. By contrast, in adjoining width regions 74 1 and 74 2 towards the side edge portion 70 1 and 70 2, respectively, the depression region 74 can be formed as an insertion aid for a pinion tooth 33 (width region 74 1) or for a roller tooth 39 (width region 74 2) falling in a chamferingled or spherically convexly curved manner towards the respective side edge portion. On account of the possible different tooth heights, the width region 74 1 of the depression region 74, which width region is assigned to the pinion tooth 33, as insertion aid in the width direction B preferably has a greater dimension than the width region 74 2 assigned to a roller tooth 39 as insertion aid.

Figure 5:
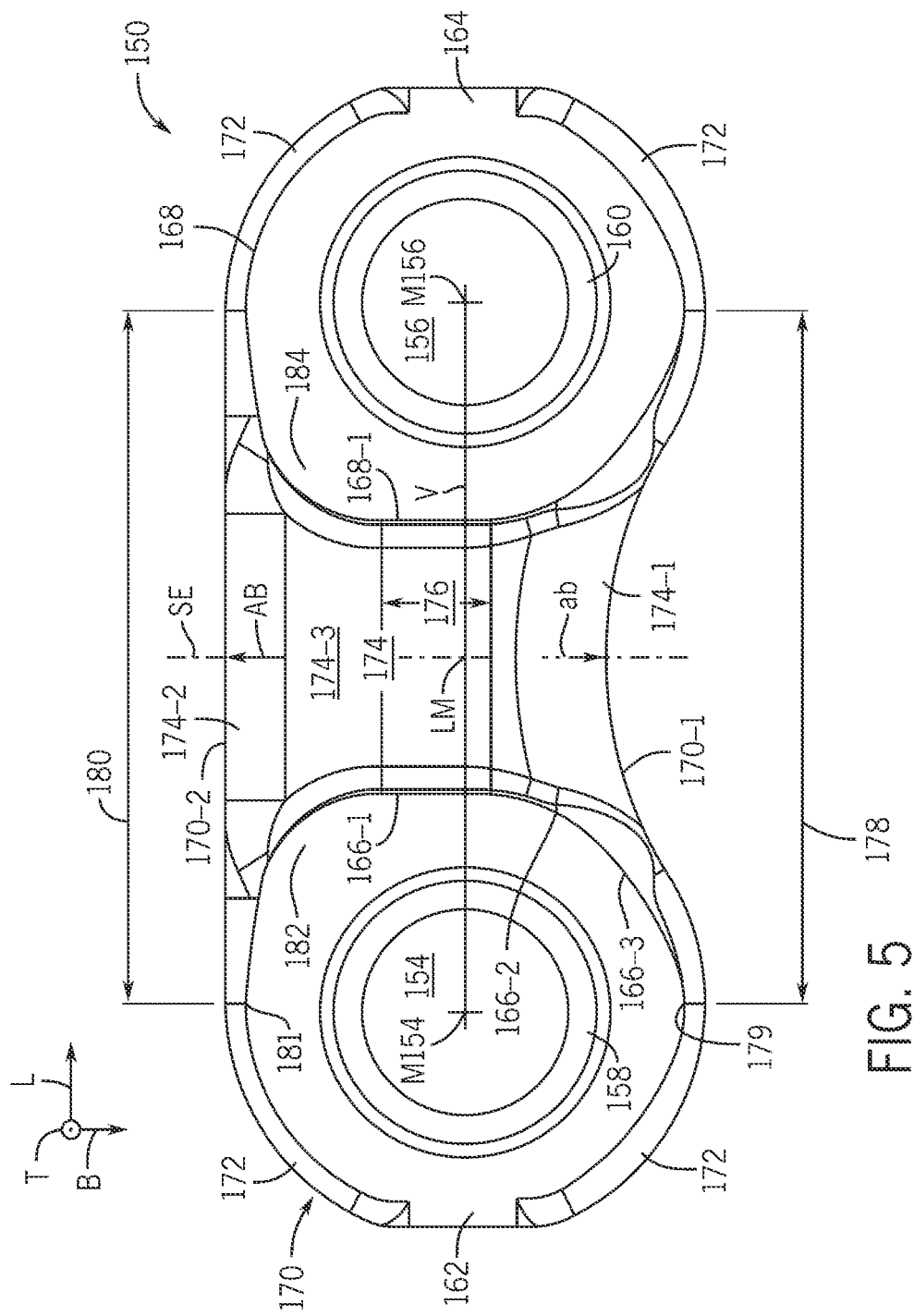
FIG. 5 illustrates a schematic elevation view of a second embodiment of an inner side of an inner link of the chain ring of FIGS. 1 to 3, in a view in a direction parallel to the thickness direction T.

FIG. 5 illustrates a second embodiment of an inner link when looking at the inner side along the thickness direction T as viewing direction. Identical and functionally identical components and component portions as on the inner link of the first embodiment are provided with the same reference numbers in FIG. 5, but increased by 100.

The second embodiment of an inner link 150 from FIG. 5 will be explained below only to the extent that it differs from the configuration of the first embodiment, to the description of which otherwise reference is also made for explaining the second embodiment.

The embodiment of the inner link 150 from FIG. 5 corresponds to the inner link 50 of FIGS. 4A to 4D except for one detail: the location 176 at which the distance in the longitudinal direction L between the flat surfaces 162 and 164 is minimal is not only a point shaped coordinate in the width direction B without a significant width dimension, but is a region 176 in which the minimum distance value does not change. Said region 176 extends in the width direction B in such a manner that it contains the connecting straight line V, wherein the distance of the parallel region edges, which run in the longitudinal direction L, from the connecting straight line V differs in size. The region edge situated closer to the side edge portion 170 1 therefore is at a considerably shorter distance from the connecting straight line V than the region edge situated closer to the opposite side edge portion 170 2. The distances can be 1 to 2 or more, preferably 1 to 3 or more. Also in the embodiment of FIG. 5, the location of a minimum distance value between the two flat surfaces 162 and 164 or between their respective edges 166 and 168 therefore extends as far as a location which is situated at a distance away from the connecting straight line V. In the width direction B on both sides of the minimum distance value region 176, the flat surfaces 162 and 164 are at greater longitudinal distances from each other than in the region 176. The locations 178 and 180 of maximum distance values on each side of the connecting straight line V again lie at the point where the respective distance straight line lies tangentially against the edges 166 and 168.

In the second embodiment of the inner link 150, the rectilinear edge portions 166 1 and 168 1 run parallel to each other in the width direction B beyond the region 176. The end situated closer to the side edge portion 170 2 in the width direction B of the minimum distance value region 176 lies further away from the side edge 170 2 than is the case for the location 76 of the first embodiment of the inner link 50 from FIG. 4A. The regions of radial protrusion 182 and 184 over the cylindrical outer surface of the chain rollers 148 lying opposite the respective flat surfaces 162 and 164 are therefore less greatly distinct than in the embodiment of FIG. 4A.

As can already be seen in the embodiment of the inner link 50 from FIG. 4A, curved edge regions which have different radii of curvature along their profile adjoin the rectilinear edge regions 166 1 and 168 1 on both sides in the width direction B.

Figure 6:
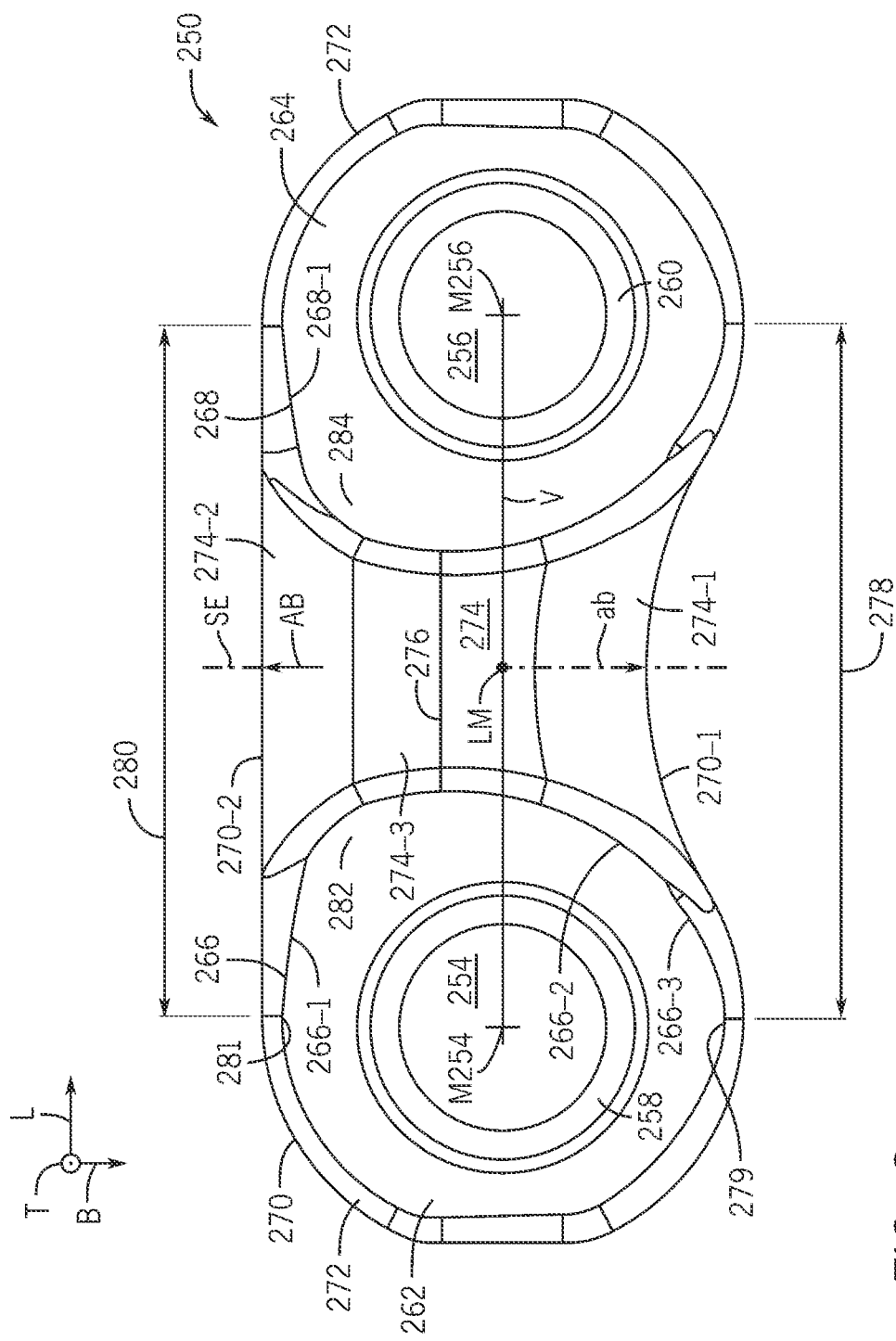
FIG. 6 illustrates a schematic elevation view of a third embodiment of an inner side of an inner link of the chain ring of FIGS. 1 to 3, in a view in a direction parallel to the thickness direction T.

FIG. 6 illustrates a third embodiment of an inner link. A top view of the inner side of the inner link 250 when viewing same in the thickness direction T can be seen in FIG. 6—as in FIG. 4A and in FIG. 5.

Identical and functionally identical components and component portions as in FIGS. 4A and 5 are provided in FIG. 6 with the same reference signs, but increased by 200 or 100. The third embodiment of FIG. 6 will be explained below only to the extent that it differs from the preceding illustrations of identical perspective of FIGS. 4A and 5, to the description of which reference should expressly otherwise also be made for the explanation of FIG. 6.

First of all, it is noticeable that the flat surfaces 262 and 264 are completely surrounded by a chamfering 272 and by the depression region 274 and therefore no regions of the flat surfaces 262 and 264 extend as far as the edge 270 of the inner link 250. However, the flat surfaces 262 and 264 can be designed in this regard to differ from the illustration of FIG. 6, like the flat surfaces 62 and 64 or 162 and 164 of the preceding embodiments.

In a departure from the second embodiment of the inner link 150 and in accordance with the first embodiment of an inner link 50, the location 276 of greatest convergence of the flat surfaces 262 and 264 with each other in the longitudinal direction L is a specific coordinate in the width direction B and is not an extended region with a significant dimension in the width direction B. Since the distance of the flat surfaces 262 and 264, like the flat surfaces 62 and 64 or 162 and 164, is synonymous with the distance of the edges 266 and 268 from each other in the longitudinal direction L, the location 276 of the minimum distance value between the flat surfaces 262 and 264 is also a location of the minimum distance value between the edges 266 and 268 bounding the respective flat surfaces 262 and 264 radially on the outside with respect to the respective center axes M254 and M256.

Unlike in the preceding embodiments, no rectilinear edge portions of the edges 266 and 268 adjoin the location 276 of the minimum distance value. Wherever the edges 266 and 268 are directly adjacent to the depression region 274, said edges run with a curved profile having different radii of curvature. Specifically at the location 276 of the minimum distance value, the radius of curvature of the respective edges 266 and 168 can be at maximum with respect to edge regions following parallel to the width direction B on both sides of the location 276. Only in a region situated close to the side edge portion 270 2, away from the location 276 of the minimum distance value, does a portion 266 1 or 268 1 of the edges 266 or 168 run rectilinearly. A profile which is rectilinear in sections can also be formed on that portion of the edges 266 and 268 which is situated furthest away from the depression region 174 in the longitudinal direction L.

The central portion 274 3 of the depression region 274 can in turn be formed flat or can be curved spherically, i.e. convexly in the top view of FIG. 6, about an axis of curvature parallel to the connecting straight line V. In the third embodiment, the chamfered regions 274 1 and 274 2 have a greater width dimension along the width direction B than in the preceding first two embodiments. The regions 274 1 or/and 274 2 can in turn be of flat design, but then preferably inclined in a direction away from the connecting straight line V towards the outer side of the inner link at 150, or likewise can be of spherical design, curved about an axis of curvature parallel to the connecting straight line V, wherein the radius of curvature of the regions 274 1 or/and 174 2 is then smaller than that of the flat central portion 274 3 of the depression region 274.

Figure 7:
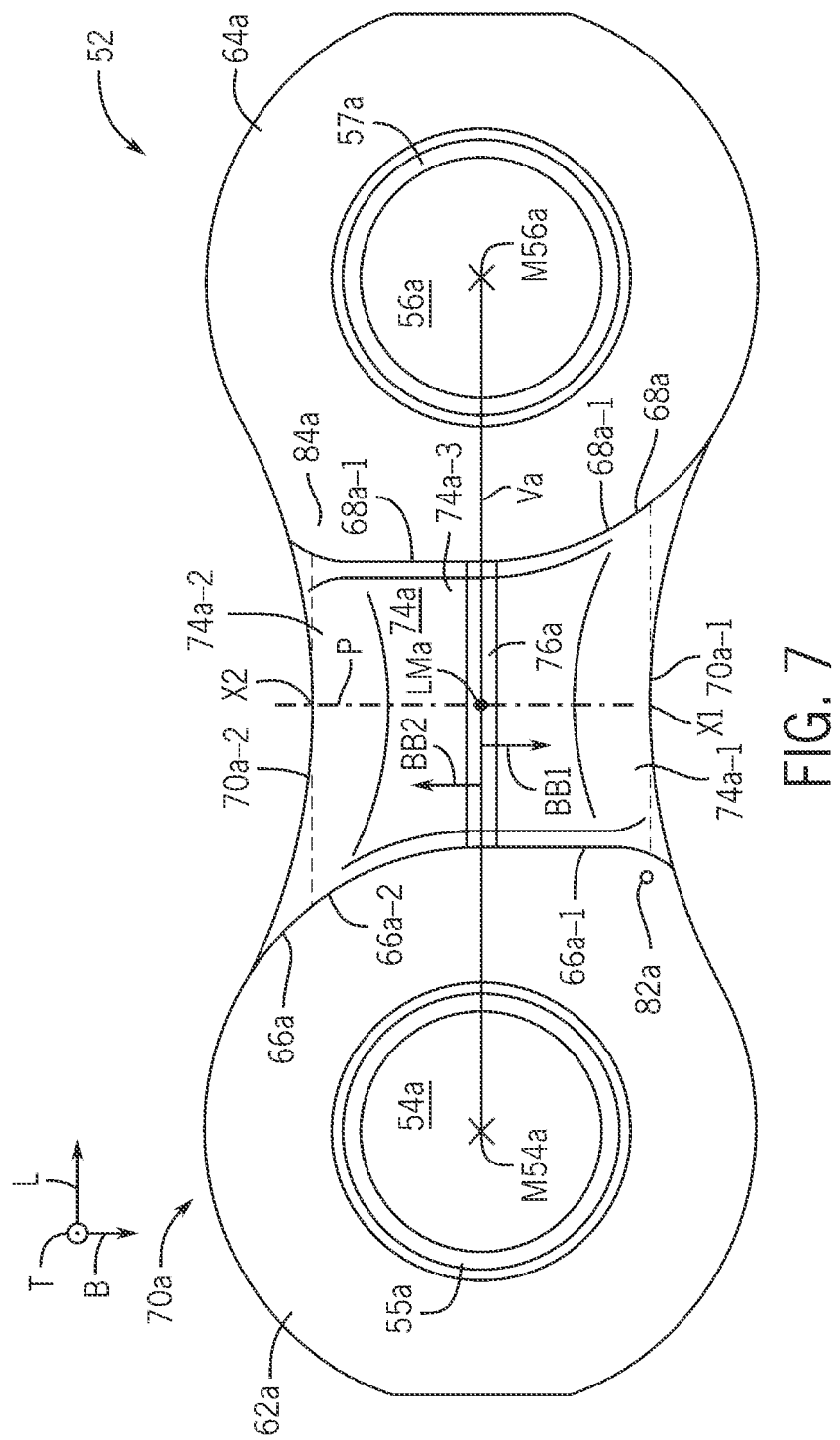
FIG. 7 illustrates a schematic elevation view of a first embodiment of an inner side of an outer link of the chain ring of FIGS. 1 to 3, in a view in a direction parallel to the thickness direction T.

FIG. 7 illustrates an inner side of a first embodiment of an outer link 52. Like the inner sides of the inner links 50, 150 and 250 of FIGS. 4A, 5 and 6, the inner side of the outer link 52 of FIG. 7 is also viewed along the thickness direction T.

Identical and functionally identical component portions of the outer link 52 in comparison with the inner sides of inner links of FIGS. 4A, 5 and 6 are denoted by the same reference numbers as in FIG. 4A, but are additionally provided with the lower case letter "a". Explanations of said component portions in conjunction with the inner links 50, 150 and 250 can also be applied because of their functional similarity or/and design similarity to component portions of identical reference sign on the outer link 52.

The outer link 52 also has connecting openings 54a and 56a which are each surrounded by a flat surface 62a and 64a, respectively. Center axes M54a and M56a which pass centrally in the thickness direction T through the connecting openings 54a and 56a, respectively, are collinear on the completely mounted bicycle chain 30 with the corresponding center axes of the connecting openings 56 and 54, respectively, of inner links 50. The center axis M54a of the outer link 52 is collinear here with a center axis M56 of an inner link 50. The center axis M56a is correspondingly collinear with a center axis M54.

Each connecting opening 54a and 56a is surrounded by a frustoconical projection 55a and 57a, respectively, which, on the finished bicycle chain 30, project into the negatively conical depressions 88 and 90, respectively, and coaxially center the outer link 52 and the inner links 50 there with respect to their respective center axes.

A portion of the flat surface 86 of the outer side of an inner link 50 therefore in each case lies opposite the flat surfaces 62a and 64a. In more precise terms, a portion of the flat surface 86 of another inner link 50 lies opposite each flat surface 62a and 64a.

Between the flat surfaces 62a and 64a, a depression region 74a is also formed on the inner side of the outer link 52, said depression region being offset in relation to the preferably coplanar flat surfaces 62a and 64a away from the inner side toward the opposite outer side of the outer link 52.

Unlike in the case of the inner links 50, the flat surfaces 62a and 64a of the outer links 52 are not surrounded by a chamfering, but rather extend as far as the edge 70a of the outer link 52. The side edge portions 70a 1 and 70a 2 lying between the connecting openings 54a and 56a are at an identical distance away from the longitudinal center LMa of the connecting straight line Va in the width direction B.

A region 76a of minimum convergence of the two flat surfaces 62a and 64a or of the edges 66a and 68a thereof in the longitudinal direction L is formed on the outer link 52 with a finite extent in the width direction B symmetrically about the connecting straight line Va. In both directions along the width direction B, the distance of the flat surfaces 62a and 64a in the longitudinal direction L from each other increases with increasing distance away from the connecting straight line Va.

The outer link 52 has, on its inner side, two width regions, namely one on each side of the connecting straight line Va. A first width region BB1 begins at the connecting straight line Va and extends in the width direction B as far as the side edge portion 70a 1 which, on the completely mounted chain 30, is situated on the radially inner side 28 1 of the chain ring 28. A second width region BB2 likewise begins at the connecting straight line Va and extends along the width direction B as far as the opposite side edge portion 70a 2, which is situated on the radially outer side 28 2 of the chain ring 28. Each width region BB1 and BB2 ends more precisely at that point X1 and X2 at which, in a top view of the inner side of the outer link 52 according to FIG. 2, the side edge portions 70*a* 1 and 70*a* 2 intersect a plane P orthogonally intersecting the connecting straight line Va in its longitudinal center LMa. The ends of each width region BB1 and BB2 are indicated by dotted lines in FIG. 7.

For the first width region BB1, it holds true that the distance of the edge 68*a* of the flat surface 64*a* from the plane P increases more greatly with increasing distance away from the connecting straight line Va in the width direction B than the opposite edge 66*a* in the longitudinal direction L.

It also holds true for the second width region BB2 that the distance of the edge 66*a* of the flat surface 62*a* from the plane P increases more greatly with increasing distance away from the connecting straight line Va in the width direction B than the distance of the edge 68*a*. The inner side of the outer link 52 is preferably spot symmetrical with respect to an axis of symmetry which orthogonally intersects the connecting straight line Va in its longitudinal center LMa and runs in the thickness direction T.

Each edge 66*a* and 68*a* has a rectilinear portion 66*a* 1 and 68*a* 1 in the width region BB1 or BB2, in which the distance of said edge from the plane B increases less greatly than the respective other edge. The rectilinear edge portions are preferably parallel to the plane P. In the other width region BB1 or BB2 in each case, the edges 66*a* and 68*a* each have a partially circular edge portion 66*a* 2 and 68*a* 2, respectively.

On the completely mounted bicycle chain, the partially circular edge portions 66*a* 2 and 68*a* 2 are congruent with partially circular portions of the edge 70 of the inner link 50. On account of the partially circular design of the two edges, said edges also remain congruent if inner link members 42 and outer link members 40 are angled relative to one another about their chain joints 46. In the region of the rectilinear edge portions 66*a* 1 and 68*a* 1, protrusions 82*a* and 84*a* protruding radially with respect to the respective center axes M54a and M56a over the edges 70 of assigned inner links 50 are formed, said protrusions opposing a penetration of dirt into a gap space between the inner side of the outer link 52 and outer side of the inner link 50.

Since the bicycle chain 50 "pushes" pinion teeth 33 in order to transmit torque to the rear wheel 16, the radial protrusion 82*a* is situated closer to the side edge portion 70*a* 1 situated on the radially inner side 28 1 of the chain ring 28 than the opposite side edge portion 70*a* 2. In the event of a meshing engagement of an outer link member 40 formed by the outer links 52, the radial protrusion 82*a* is therefore located in the region of the tooth root of a pinion tooth 33 which engages in an outer link intermediate space essentially formed by the depression region 74*a*.

The central region 74*a* 3, containing the connecting straight line Va, of the depression region 74*a* can in turn be of flat design, specifically preferably parallel to the flat outer side of the outer link 52. Regions 74*a* 1 and 74*a* 2 which extend from the central region 74*a* 3 of the depression region 74*a* as far as the respective side edge portion 70*a* 1 and 70*a* 2 can in turn be designed as insertion slopes for a pinion tooth 33 into the outer link intermediate space.

As FIG. 7 shows, the distance of the two edges 66*a* and 68*a* in the longitudinal direction L from each other changes more greatly in the two width regions BB1 and BB2 in the outermost 30% width dimension in the width direction, which contains the respective end points X1 and X2, than in the innermost 30% width dimension, starting directly from the connecting straight line Va, of each width region BB1 and BB2. The change of the distance of the edges 66*a* and 68*a* from each other in the longitudinal direction L in a portion in the width direction B is defined as the difference in the distances at the beginning and at the end of the portion, divided by the distance at the beginning of the respective portion.

Figure 8:
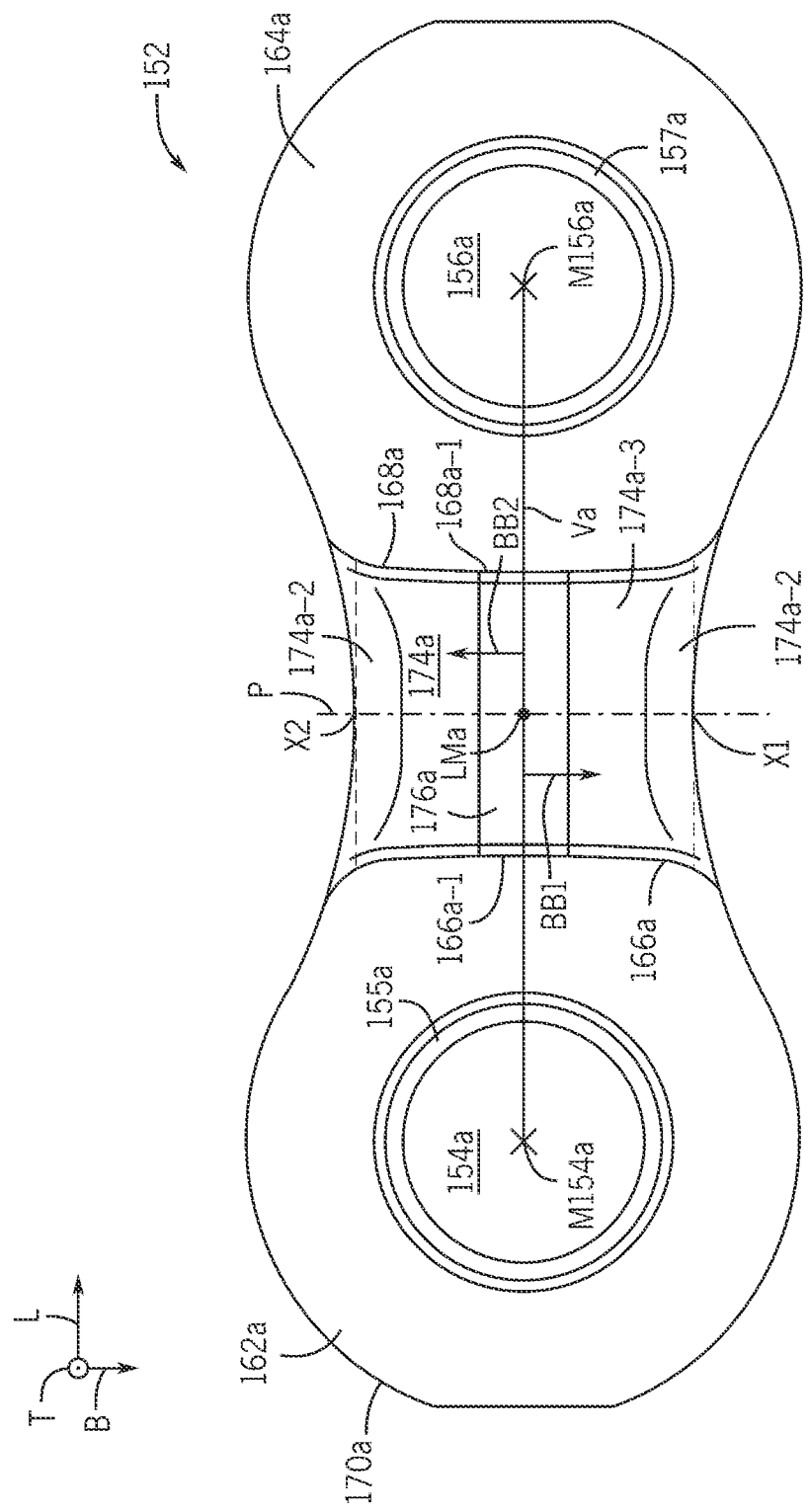
FIG. 8 illustrates a schematic elevation view of a second embodiment of an inner side of an outer link of the chain ring of FIGS. 1 to 3, in a view in a direction parallel to the thickness direction T.

FIG. 8 illustrates a second embodiment of an outer link, wherein FIG. 8 shows the inner side of the outer link when looking along the thickness direction T. Identical and functionally identical components and component portions as in FIG. 7 are provided with the same reference numbers in FIG. 8, but increased by 100. The second embodiment of an outer link 152 of FIG. 8 will be described below only in so far as it differs from the first embodiment of the outer link 52 from FIG. 7, to the description of which reference is otherwise also made for explaining the second embodiment of FIG. 8.

In contrast to the point symmetrical inner side of the outer link 52, the inner side of the second embodiment of the outer link 152 is mirror symmetrical both with respect to the plane P and also with respect to a plane running in the thickness direction T and containing the connecting straight line Va. The outer link 152 of the second embodiment can therefore be mounted with a lower risk of error than that of FIG. 7 since every mirror symmetry reduces the possibilities of an erroneous arrangement of a link on the bicycle chain 30. In addition, the outer link 152 can lie opposite itself whereas the outer link 52 requires a counterpart which is mirror symmetrical with respect to a plane parallel to the plane of the drawing of FIG. 7 in order to form an outer link intermediate space delimited in a mirror inverted manner in the thickness direction T.

In the second embodiment, the central region 176*a*, in which the edges 166*a* and 168*a* are at the smallest distance from each other in the longitudinal direction L, has a greater dimension in the width region B than in the first embodiment. Rectilinear edge regions 166*a* 1 and 168*a* 1 lie directly opposite each other in the longitudinal direction L. The distance of the edges 166*a* and 168*a* from each other increases along the width direction B on both sides of the region 176*a* of minimum longitudinal distance, wherein the change or increase in the second embodiment is greater in the outermost 10% width dimension of the width region BB1 that contains the point X1 than in the innermost 50% width dimension of the width region BB1 that contains the connecting straight line Va. For the width region BB2, the same correspondingly holds true because of said mirror symmetry with respect to the plane of symmetry containing the connecting straight line Va and running in the thickness direction T.

In a departure from the illustration of FIG. 8, the edges 166*a* and 168*a* cannot have any rectilinear portion whatsoever at the location at which they are adjacent to the depression region 174*a*, but rather can each have a convex configuration, as viewed from the longitudinal center LMa of the connecting straight line Va. The location 176*a* of minimum distance of the edges 166*a* and 168*a* from each other in the longitudinal direction L then coincides with the connecting straight line Va.

Both in the configuration illustrated in FIG. 8 and in the alternative described in the preceding paragraph, the radius of curvature of the curvature of the edges 166*a* and 168*a* changes in the curved edge portion of the edges 166*a* and 168*a* with increasing distance from the location 176*a* of the minimum distance value towards radius values becoming ever smaller, preferably until the edge 170a of the outer link 152 is reached.

In an embodiment, a chain ring (28) involves a bicycle chain (30) revolving in a self-contained manner and having outer and inner link members (40, 42) following one another in an alternating manner in the revolving direction (D), wherein the inner link members (42) are formed from two asymmetric inner links (50; 150; 250), as is described herein, and/or the outer link members (40) are formed from two outer links (52; 152) as is described herein. The inner link members (42) may be formed from two asymmetric inner links (50; 150; 250), wherein the side edge portions (70a 2; 170a 2; 270a 2) at the greater distance from the connecting straight line (Va) are arranged lying radially on the outside of the chain ring (28).

We claim:

1. A bicycle chain outer link, comprising:
   two connecting openings which are formed at a distance from each other, pass through the outer link in the thickness direction thereof and are each designed for receiving a connecting component in order to connect the outer link to a further outer link in order to form an outer link member of a bicycle chain,
   wherein a connecting straight line connecting respective center axes of the connecting openings defines a longitudinal direction of the outer link,
   wherein a direction orthogonal both with respect to the longitudinal direction and with respect to the thickness direction is a width direction of the outer link,
   wherein the outer link has, on its inner side facing the further outer link of the same outer link member in the completely mounted state in a bicycle chain, two flat surfaces which are provided at a distance from one another in the longitudinal direction if the outer link and are separated by a depression region, which is placed in the longitudinal direction between them, and of which each flat surface surrounds another of the connecting openings,
   wherein the depression region is set back with respect to the flat surfaces towards an outer side of the outer link that is opposite the inner side,
   wherein, in a minimum distance region containing the connecting straight line and extending in the width direction, the distance, to be measured in the longitudinal direction, between the flat surfaces is minimal,
   wherein the distance between the flat surfaces starting from the minimum distance region becomes larger towards each of the two side edges bounding the outer link in the width direction, and the connecting straight line intersects one side edge of the two side edges at a region forming a straight edge in the width direction.

2. The bicycle chain outer link according to claim 1, wherein, for at least one width region of the outer link, which width region extends from the connecting straight line parallel to the width direction as far as the longitudinal center of a side edge, for both width regions it holds true that a distance, to be measured in the longitudinal direction, between edges, which are adjacent to the depression region, of the flat surfaces changes more greatly in the 50%, of the width dimension of the width region that is situated closest to the longitudinal center of the side edge than in the 30% of the width dimension of the width region that is situated closest to the connecting straight line.

3. The bicycle chain outer link according to claim 1, wherein the distance in the direction of the one side edge on a first side of a reference plane orthogonally intersecting the connecting straight line in its longitudinal center increases more greatly than on the opposite, second side of the reference plane, and wherein the distance in the opposite direction towards the respective other side edge on the second side of the reference plane increases more greatly than on the first side thereof.

4. The bicycle chain outer link according to claim 3, wherein, for at least one flat surface a region of the edge of the flat surface that is adjacent to the depression region is curved to a differing degree in the width direction on different sides of the connecting straight line.

5. The bicycle chain outer link according to claim 4, wherein, for at least one flat surface the region of the edge of the flat surface that is adjacent to the depression region has a curved profile in portions in the width direction on one side of the connecting straight line and a rectilinear profile in portions on the other side.

6. The bicycle chain outer link according to claim 5, wherein a curved edge region portion of the respective other flat surface lies opposite that edge region portion which is rectilinear in portions in the longitudinal direction.

7. The bicycle chain outer link according to claim 1, wherein, in a first width region of the outer link, which width region extends from the connecting straight line parallel to the width direction as far as the longitudinal center of the one side edge, the distance between edges of the flat surfaces that are adjacent to the depression region is at maximum on the longitudinal center of the one side edge, and in that, in a second width region of the outer link, which width region extends from the connecting straight line parallel to the width direction in the opposite direction as far as the longitudinal center of the other side edge, the distance between edges of the flat surfaces that are adjacent to the depression region is at maximum on the other side edge, wherein the maximum distances in the first and in the second width region are identical in size in terms of amount.

8. The bicycle chain outer link according to claim 1, wherein each of the connecting openings is surrounded radially within the flat surface surrounding them by a projection protruding over the respective flat surface in the thickness direction.

9. The bicycle chain outer link according to claim 1, wherein the inner side and/or the outer side, is point symmetrical with respect to an axis of symmetry intersecting the connecting straight line in the longitudinal center thereof and running in the thickness direction.

10. The bicycle chain outer link according to claim 1, wherein the inner side and/or the outer side is mirror symmetrical both with respect to a first plane of symmetry orthogonally intersecting the connecting straight line in the longitudinal center thereof and with respect to a second plane of symmetry running in the thickness direction and containing the connecting straight line.

* * * * *